US012100335B2

(12) United States Patent
Wang et al.

(10) Patent No.: US 12,100,335 B2
(45) Date of Patent: Sep. 24, 2024

(54) POWER EFFICIENT DISPLAY ARCHITECTURE

(71) Applicant: QUALCOMM Incorporated, San Diego, CA (US)

(72) Inventors: Chun Wang, Markham (CA); Sreekanth Modaikkal, Bangalore (IN); Kumar Saurabh, Bangalore (IN); Samson Kim, Richmond Hill (CA); Kit Fong Ng, Thornhill (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/056,649

(22) Filed: Nov. 17, 2022

(65) Prior Publication Data

US 2024/0169883 A1 May 23, 2024

(51) Int. Cl.
*G09G 3/20* (2006.01)
*G09G 3/00* (2006.01)
*G09G 5/391* (2006.01)

(52) U.S. Cl.
CPC ........... *G09G 3/2096* (2013.01); *G09G 3/001* (2013.01); *G09G 5/391* (2013.01); *G09G 2310/08* (2013.01); *G09G 2330/021* (2013.01); *G09G 2340/0407* (2013.01); *G09G 2360/06* (2013.01); *G09G 2360/08* (2013.01); *G09G 2370/10* (2013.01); *G09G 2370/16* (2013.01)

(58) Field of Classification Search
CPC .................................................. G09G 3/2096
See application file for complete search history.

(56) References Cited

U.S. PATENT DOCUMENTS

| | | | | |
|---|---|---|---|---|
| 2009/0167366 A1* | 7/2009 | Wang | ................... | H04N 21/242 |
| | | | | 375/E7.279 |
| 2011/0052142 A1 | 3/2011 | Sultenfuss et al. | | |
| 2013/0191677 A1* | 7/2013 | Ziesler | .................. | G06F 1/3237 |
| | | | | 327/175 |
| 2013/0235039 A1* | 9/2013 | Montag | ................ | G09G 3/2092 |
| | | | | 345/428 |
| 2017/0287384 A1* | 10/2017 | Lee | .......................... | G09G 5/395 |
| 2017/0330496 A1 | 11/2017 | Oravainen | | |
| 2018/0013978 A1 | 1/2018 | Duan et al. | | |
| 2019/0065372 A1* | 2/2019 | Roychowdhury | .. | G06F 12/0811 |
| 2019/0318709 A1* | 10/2019 | Wicks | .................... | G09G 5/373 |

(Continued)

OTHER PUBLICATIONS

International Search Report and Written Opinion—PCT/US2023/036367—ISA/EPO—Feb. 20, 2024.

*Primary Examiner* — Gustavo Polo
(74) *Attorney, Agent, or Firm* — Procopio, Cory, Hargreaves & Savitch

(57) ABSTRACT

This disclosure provides systems, devices, apparatus, and methods, including computer programs encoded on storage media, for a power efficient display architecture. A display processor may obtain an indication that UC is to be displayed at a first resolution or a second resolution, where the first resolution is higher than the second resolution. The display processor may drive a first display via a first controller of a first DPU based on the indication. The display processor may drive a second display via a controller of a second DPU if the UC is to be displayed at the first resolution, or drive the second display via a second controller of the first DPU if the UC is to be displayed at the second resolution.

30 Claims, 17 Drawing Sheets

(56) References Cited

U.S. PATENT DOCUMENTS

2020/0154120 A1    5/2020  Venkitasubramani et al.
2022/0075199 A1*   3/2022  Trisnadi .................. G02B 27/18
2022/0206667 A1*   6/2022  Zhang ..................... G09G 5/08

* cited by examiner

POWER EFFICIENT DISPLAY ARCHITECTURE

TECHNICAL FIELD

The present disclosure relates generally to processing systems, and more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques of display processing for virtual reality (VR) applications may not address issues pertaining to supporting both high resolution user content and low resolution user content in a system with multiple display processing unit (DPU) cores. There is a need for improved techniques for managing multiple DPU cores for VR applications and for synchronizing timing between the multiple DPU cores.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for display processing are provided. The apparatus includes a memory and at least one processor coupled to the memory and, based at least in part on information stored in the memory, the at least one processor is configured to: obtain an indication that user content (UC) is to be displayed at a first resolution or a second resolution, where the first resolution is higher than the second resolution; drive a first display via a first controller of a first display processing unit (DPU) based on the indication; and drive a second display via a controller of a second DPU if the UC is to be displayed at the first resolution, or drive the second display via a second controller of the first DPU if the UC is to be displayed at the second resolution.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
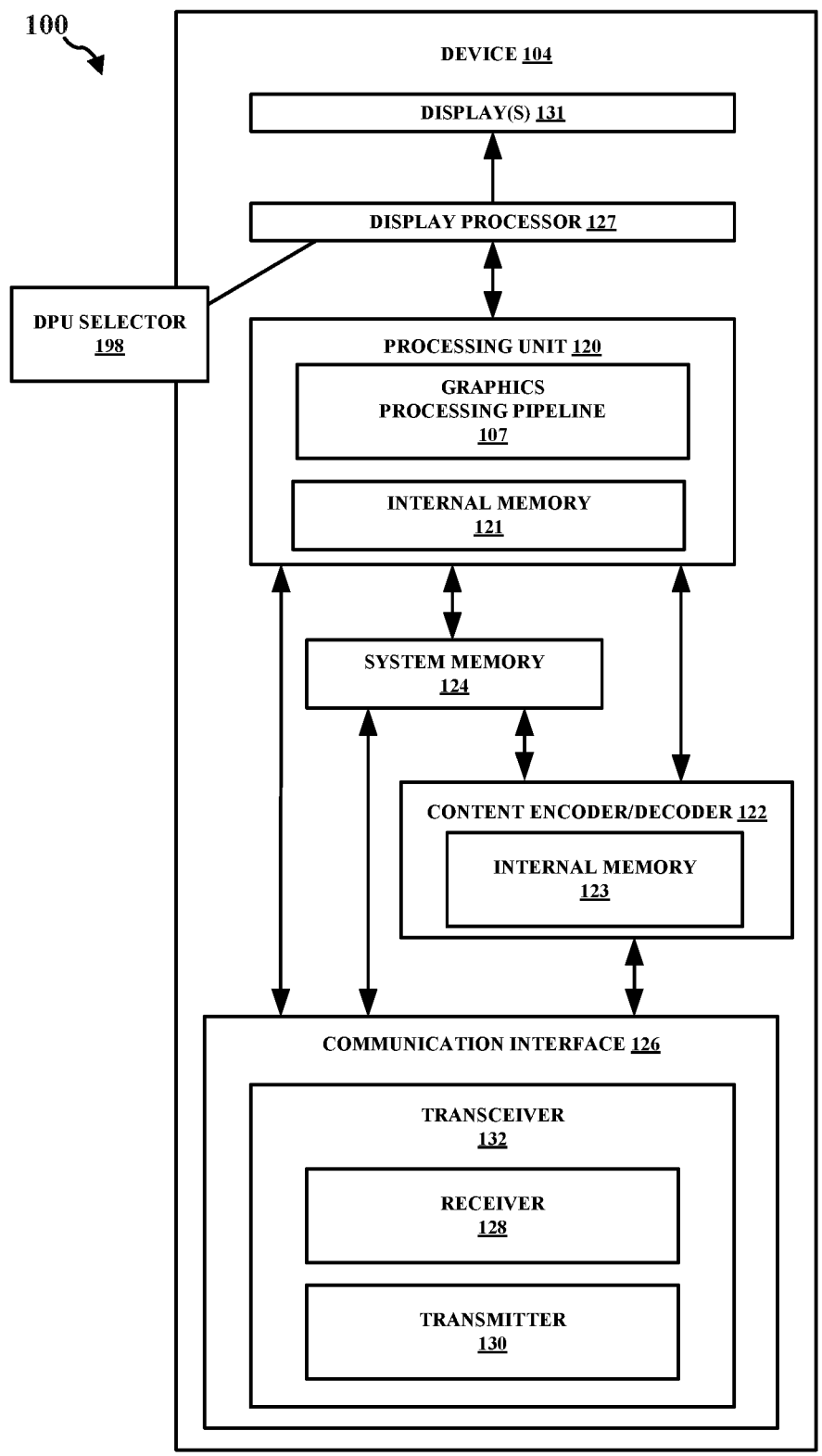
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

In order for user content (UC) associated with a virtual reality (VR) application to be displayed to a user, a display processing unit (DPU) may fetch a GPU rendered layer of the UC, apply chromatic aberration correction (CAC) to the GPU rendered layer, and display processed overlay layers to left and right eye panels of a VR headset (e.g., VR glasses), respectively. Different VR applications may be associated with different display resolutions. For example, a first VR application may display UC (e.g., image frames) at a first resolution (e.g., approximately 2000×2000 pixels for each eye panel at 60 frames per second (FPS)) and a second VR application may display UC at a second resolution (e.g., approximately 4000×4000 pixels for each eye panel at 60 FPS). To accommodate higher resolutions, a VR headset may be configured with a system-on-chip (SOC) (also referred to as a system on a chip) that includes multiple DPU cores. Current techniques of display processing for VR applications may not address issues pertaining to supporting both high resolution user content and low resolution user content in a system with multiple display processing unit (DPU) cores. Furthermore, current techniques for display processing may not address timing synchronization issues that may occur between the multiple DPU cores.

Various technologies pertaining to a power efficient, flexible VR display architecture and multi-DPU core synchronization are described herein. In an example, an apparatus obtains an indication that UC is to be displayed at a first resolution or a second resolution, where the first resolution is higher than the second resolution. The apparatus drives a first display via a first controller of a first DPU based on the indication. The apparatus drives a second display via a controller of a second DPU if the UC is to be displayed at the first resolution, or drive the second display via a second controller of the first DPU if the UC is to be displayed at the second resolution. By selectively driving the second display via the second controller of the first DPU or the controller for the second DPU based on whether or the UC is to be displayed at the first resolution (e.g., high resolution) or the second resolution (e.g., low resolution), the apparatus may provide for reduced power consumption for displaying UC. In another example, the apparatus may establish a display timing at a first interface of the first DPU. The display timing may include one or more of a display frame rate, a line rate, and/or a pixel rate. The apparatus may synchronize the first DPU and the second DPU based on the display timing. Thus, the apparatus may provide for timing synchronization across multiple DPU cores.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a system-on-chip (SOC). The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a DPU selector 198 configured to obtain an indication that UC is to be displayed at a first resolution or a second resolution, where the first resolution is higher than the second resolution. The DPU selector 198 is configured to drive a first display via a first controller of a first DPU based on the indication. The DPU selector 198 is configured to drive a second display via a controller of a second DPU if the UC is to be displayed at the first resolution, or drive the second display via a second controller of the first DPU if the UC is to be displayed at the second resolution. Although the following description may be focused on display processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
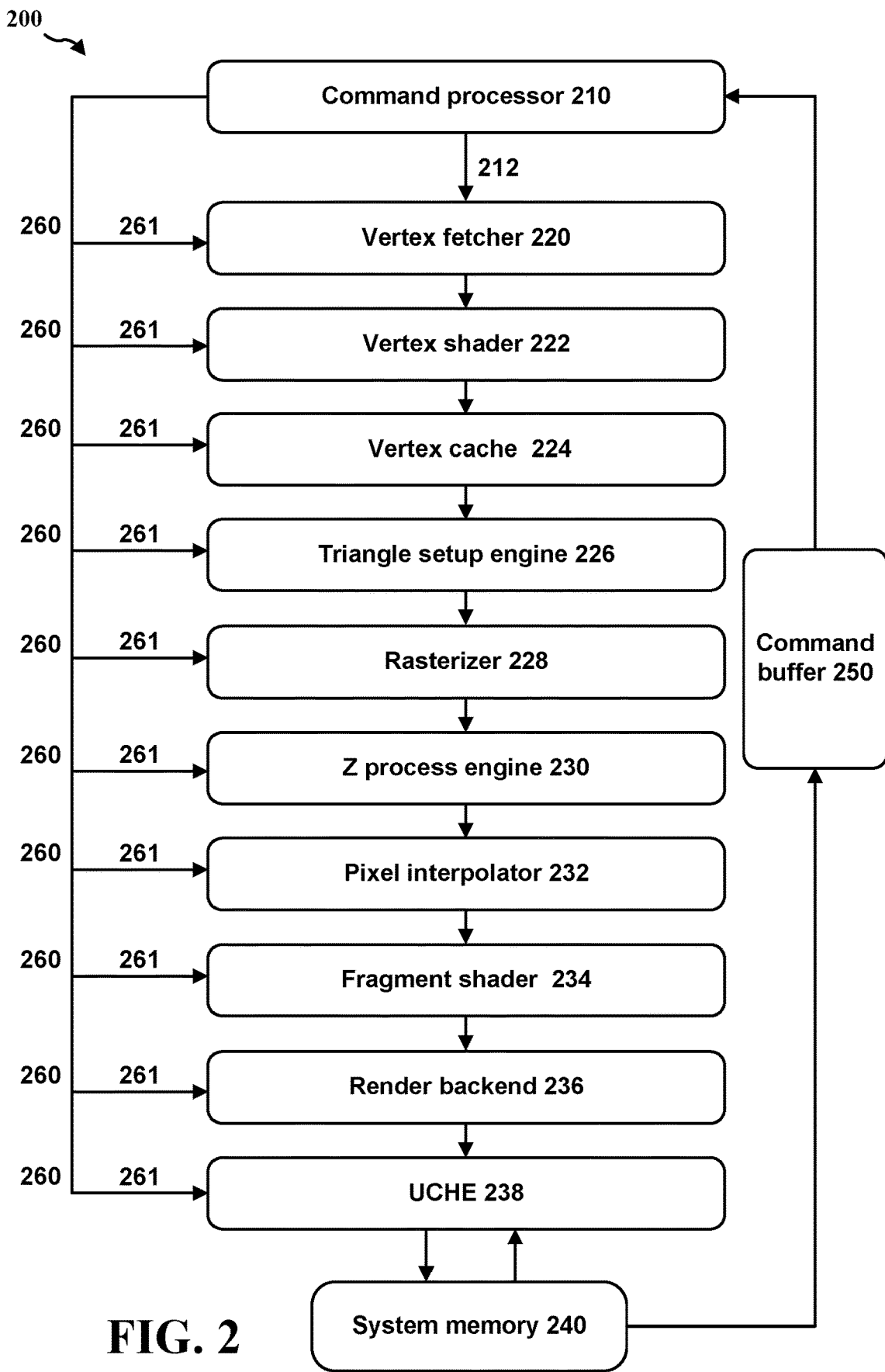
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified. In contrast to tiled rendering, direct rendering does not divide the frame into smaller bins or tiles. Rather, in direct rendering, the entire frame is rendered at a single time. Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
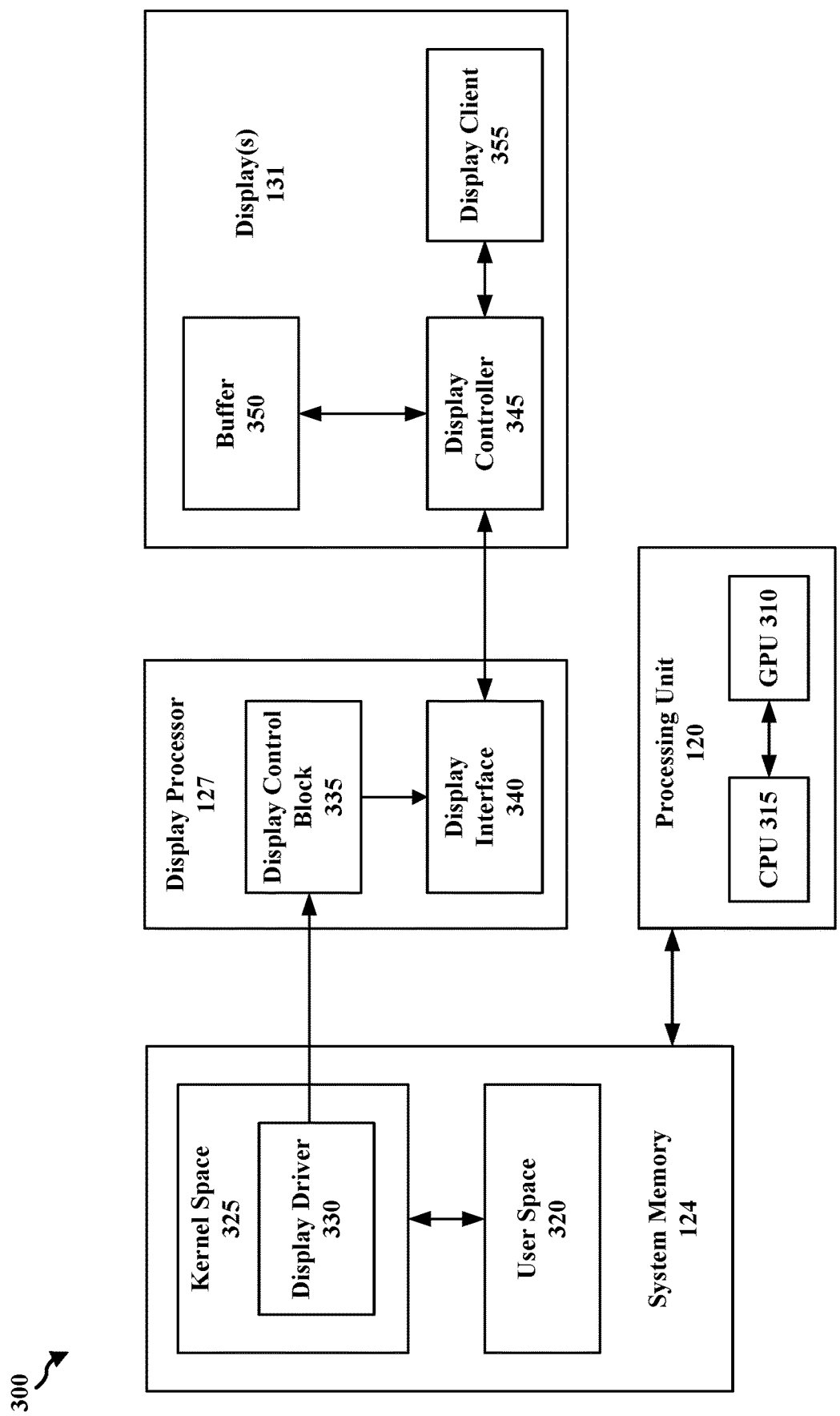
FIG. 3 illustrates an example display framework including a display processor and a display.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Figure 4:
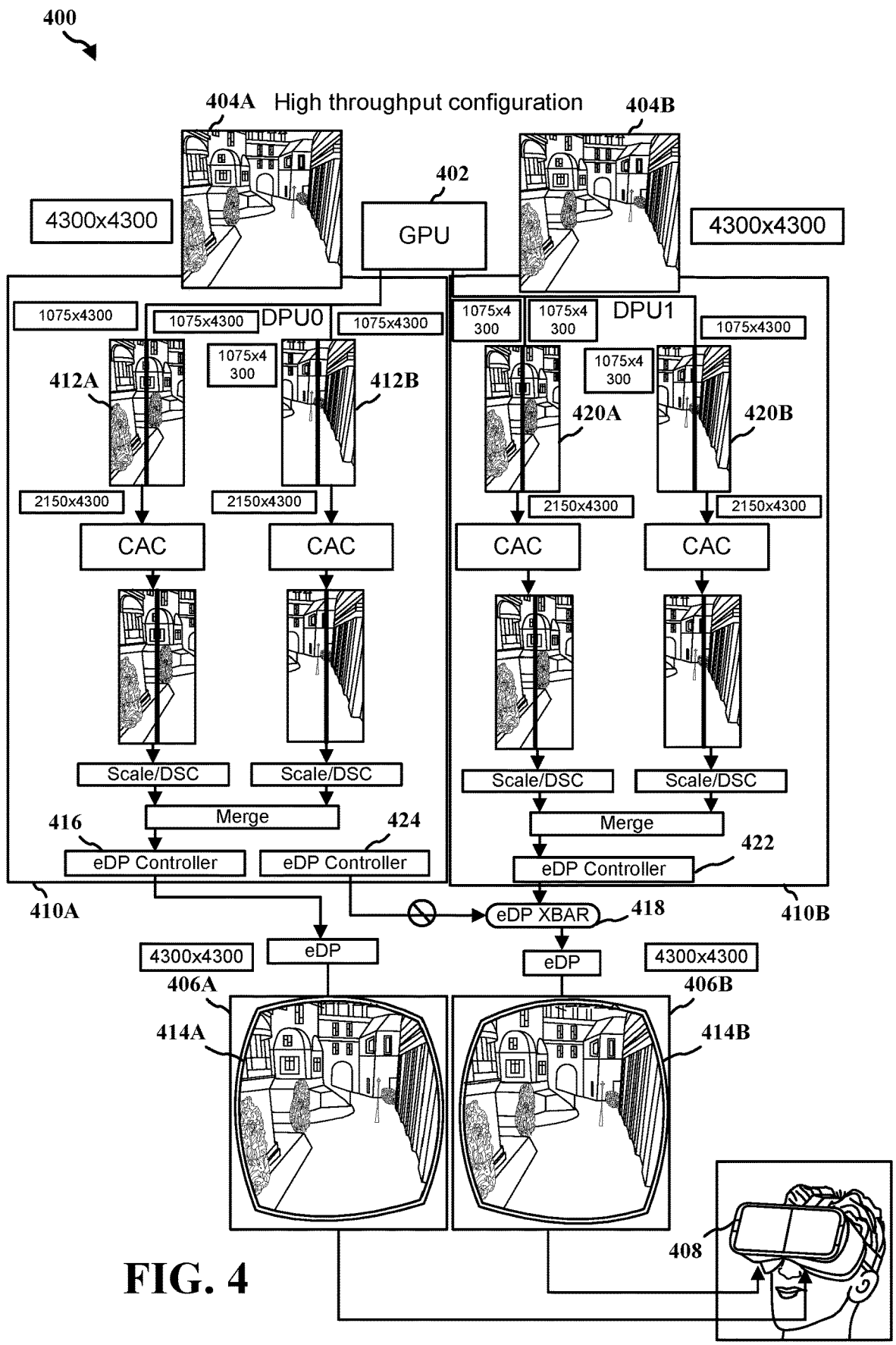
FIG. 4 is a diagram illustrating an example of a high throughput display processing unit (DPU) configuration.

FIG. 4 is a diagram 400 illustrating an example of a high throughput DPU configuration. A GPU 402 may obtain a first frame 404A and a second frame 404B. The first frame 404A and the second frame 404B may be associated with user content (UC) that is to be displayed to a user (e.g., concurrently displayed to the user). In an example, the first frame 404A may be for display on a first display 406A of a wearable headset 408 and the second frame 404B may be for display on a second display 406B of the wearable headset 408. For instance, the first frame 404A may be for display to a left eye of the user and the second frame 404B may be for display to a right eye of the user. In an example, the first display 406A and the second display 406B may be embedded DisplayPort (eDP) displays. In another example, the first display 406A and the second display 406B may part of a single display panel, that is, the first display 406A may be a first portion (e.g., a left portion) of the single display and the second display 406B may be a second portion (e.g., a right portion) of the single display. The wearable headset 408 may be an augmented reality (AR) headset, a virtual reality (VR) headset, a mixed reality (MR) headset, and/or an extended reality (XR) headset. As such, the first frame 404A and the second frame 404B may be associated with augmented reality content, VR content, MR content, and/or XR content. In an example, the first frame 404A and the second frame 404B may have a resolution of 4300×4300 pixels.

The GPU 402 may provide the first frame 404A to a first DPU 410A (labeled as "DPU0" in FIG. 4). The first DPU 410A may be included in the wearable headset 408. The first DPU 410A may divide the first frame 404A into a first slice 412A and an Nth slice 412B, where N is a positive integer greater than one. The first slice 412A and the Nth slice 412B may be collectively referred to as "a first plurality of slices 412A-412B." In an example, each of the first plurality of slices 412A-412B may be vertical slices. In an example in which N is 4, each slice in the first plurality of slices 412A-412B may have a resolution of 1075×4300 pixels. In an example in which N is 2, each slice in the first plurality of slices 412A-412B may have a resolution of 2150×4300 pixels.

The first DPU 410A may perform chromatic aberration correction (CAC) on each of the first plurality of slices 412A-412B. Chromatic aberration may refer to an optical aberration that is caused by a failure of a lens to focus all colors at the same point. Chromatic aberration may be observed as fringes of color along boundaries that separate dark parts and bright parts of an image. CAC may refer to a process that minimizes chromatic aberration.

The first DPU 410A may perform a scaling/DSC operation on each of the first plurality of slices 412A-412B. A scaling/DSC operation may refer to a display stream compression. Display stream compression may be a visually lossless compression that reduces bandwidth demands on a DPU. The first DPU 410A may merge each of the first plurality of slices 412A-412B to generate a first processed frame 414A. The first processed frame 414A may have the same resolution as the first frame 404A (e.g., 4300×4300 pixels). A first embedded DisplayPort (eDP) controller 416 of the first DPU 410A may cause the first processed frame 414A to be displayed on the first display 406A (e.g., via a eDP interface).

An eDP crossbar (e.g., "an eDP XBAR 418") may be associated with the first DPU 410A and a second DPU 410B (labeled as "DPU1" in FIG. 4). In an example, the eDP XBAR 418 may be part of the first DPU 410A and/or the second DPU 410B. The eDP XBAR 418 may obtain an indication that the UC is to be displayed (e.g., rendered) at a high resolution (e.g., 4300×4300 pixels on each of the first display 406A and the second display 406B). The eDP XBAR 418 may determine that the second DPU 410B is to be utilized to drive display of the second frame 404B based on the indication. In one aspect, the eDP XBAR 418 may be a XBAR module that may be implemented to multiplex (MUX) an eDP interface of a controller from the first DPU 410A and an eDP interface of the second DPU 410B. The eDP XBAR 418 may be software controllable. According to examples, the eDP XBAR 418 may be controlled by a display driver, display driver software, or a CPU. In an example, the first DPU 410A and the second DPU 410B may be part of a system-on-chip (SOC).

Based on an output of the eDP XBAR 418, the GPU 402 may provide the second frame 404B to the second DPU 410B. The second DPU 410B may be included in the wearable headset 408. The second DPU 410B may divide the second frame 404B into a first slice 420A and an Nth slice 420B, where N is a positive integer greater than one. The first slice 420A and the Nth slice 420B may be collectively referred to as "a second plurality of slices 420A-420B." In an example, each of the second plurality of slices 420A-420B may be vertical slices. In an example in which N is 4, each slice in the second plurality of slices 420A-420B may have a resolution of 1075×4300 pixels. In an example in which N is 2, each slice in the second plurality of slices 420A-420B may have a resolution of 2150×4300 pixels.

The second DPU 410B may perform CAC on each of the second plurality of slices 420A-420B. The second DPU 410B may perform a scaling/DSC operation on each of the second plurality of slices 420A-420B. The second DPU 410B may merge each of the second plurality of slices 420A-420B to generate a second processed frame 414B. The second processed frame 414B may have the same resolution as the second frame 404B (e.g., 4300×4300 pixels). An eDP controller 422 of the second DPU 410B may cause the second processed frame 414B to be displayed on the second display 406B (e.g., via a eDP interface) concurrently with the first processed frame 414A. A second eDP controller 424 of the first DPU 410A may remain inactive based on the determination by the eDP XBAR 418 that the UC was to be rendered at the high resolution.

Figure 5:
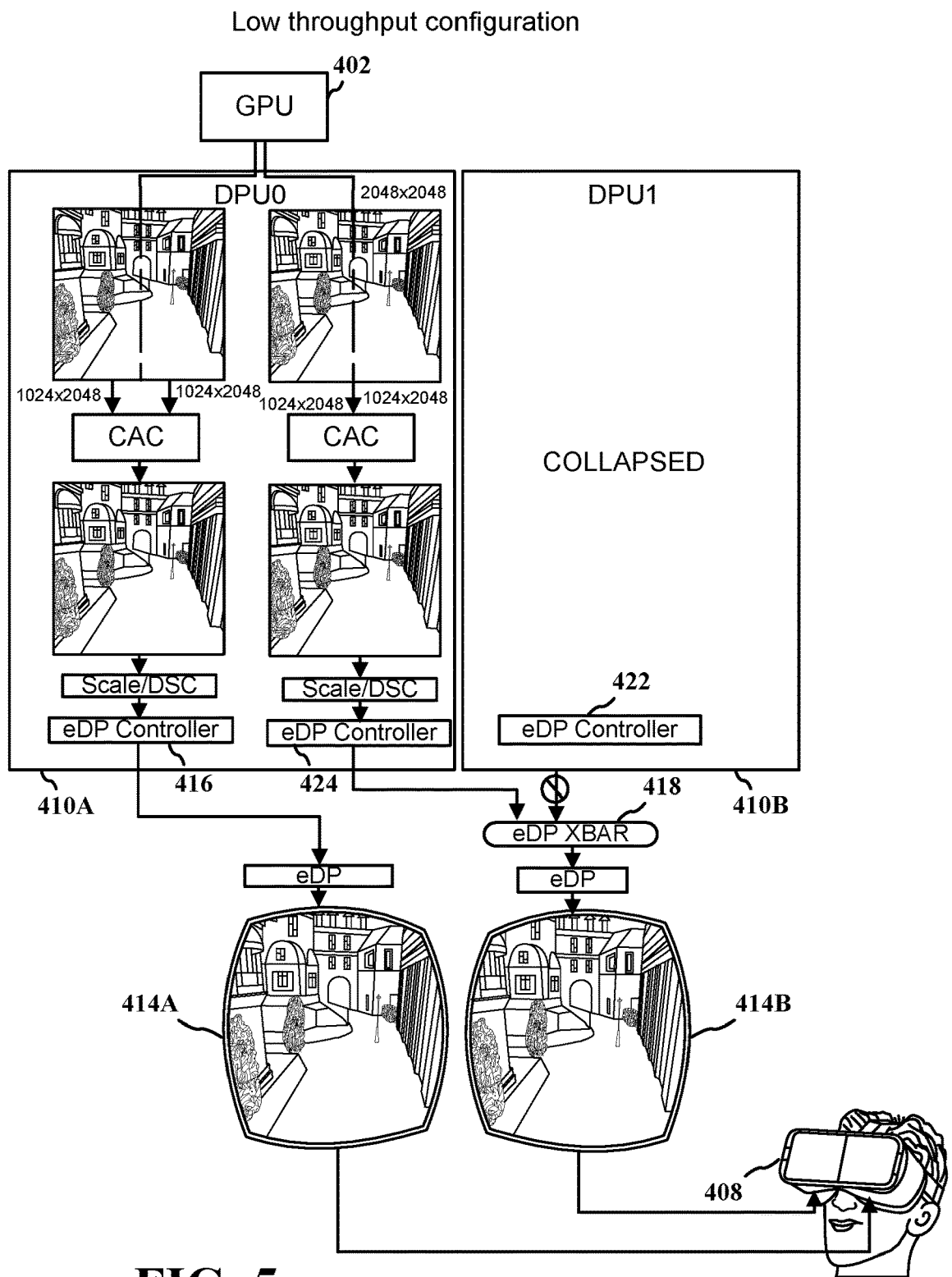
FIG. 5 is a diagram illustrating an example of a low throughput DPU configuration.

FIG. 5 is a diagram 500 illustrating an example of a low throughput DPU configuration. In the low throughput DPU configuration, the eDP XBAR 418 may obtain an indication that UC is to be displayed (e.g., rendered) at a low resolution (e.g., 2048×2048 pixels on each of the first display 406A and the second display 406B). The eDP XBAR 418 may determine that the second eDP controller 424 of the first DPU 410A is to be utilized to drive display of the second frame 404B based on the indication while the second DPU 410B is to be placed in a power collapsed state. The term power collapsed state may refer to a scenario in which power is removed (i.e., a current and a voltage are cut off) from a DPU. In an example, the power collapsed state may be a globally distributed switch (GDS) power collapsed state.

In the low throughput DPU configuration, the GPU 402 may obtain the first frame 404A and the second frame 404B. Based on a determination by the eDP XBAR 418, the GPU 402 may provide the first frame 404A and the second frame 404B to the first DPU 410A. The first DPU 410A may divide the first frame 404A and the second frame 404B into the first plurality of slices 412A-412B and the second plurality of slices 420A-420B. In an example, each of the first plurality of slices 412A-412B and each of the second plurality of slices 420A-420B may have a resolution of 1024×2048 pixels. The first DPU 410A may perform CAC on each of the first plurality of slices 412A-412B and the second plurality of slices 420A-420B. The first DPU 410A may perform a scaling/DSC operation on each of the first plurality of slices 412A-412B and each of the second plurality of slices 420A-420B. The first DPU 410A may merge each of the first plurality of slices 412A-412B to generate the first processed frame 414A. The first DPU 410A may merge each of the second plurality of slices 420A-420B to generate the second processed frame 414B.

The first eDP controller of the first DPU 410A may cause the first processed frame 414A to be displayed on the first display 406A. Similarly, based on the determination of the eDP XBAR 418, the second eDP controller 424 of the first DPU 410A may cause the second processed frame 414B to be displayed on the second display 406B concurrently with the first processed frame 414A being displayed on the first display 406A.

Figure 6:
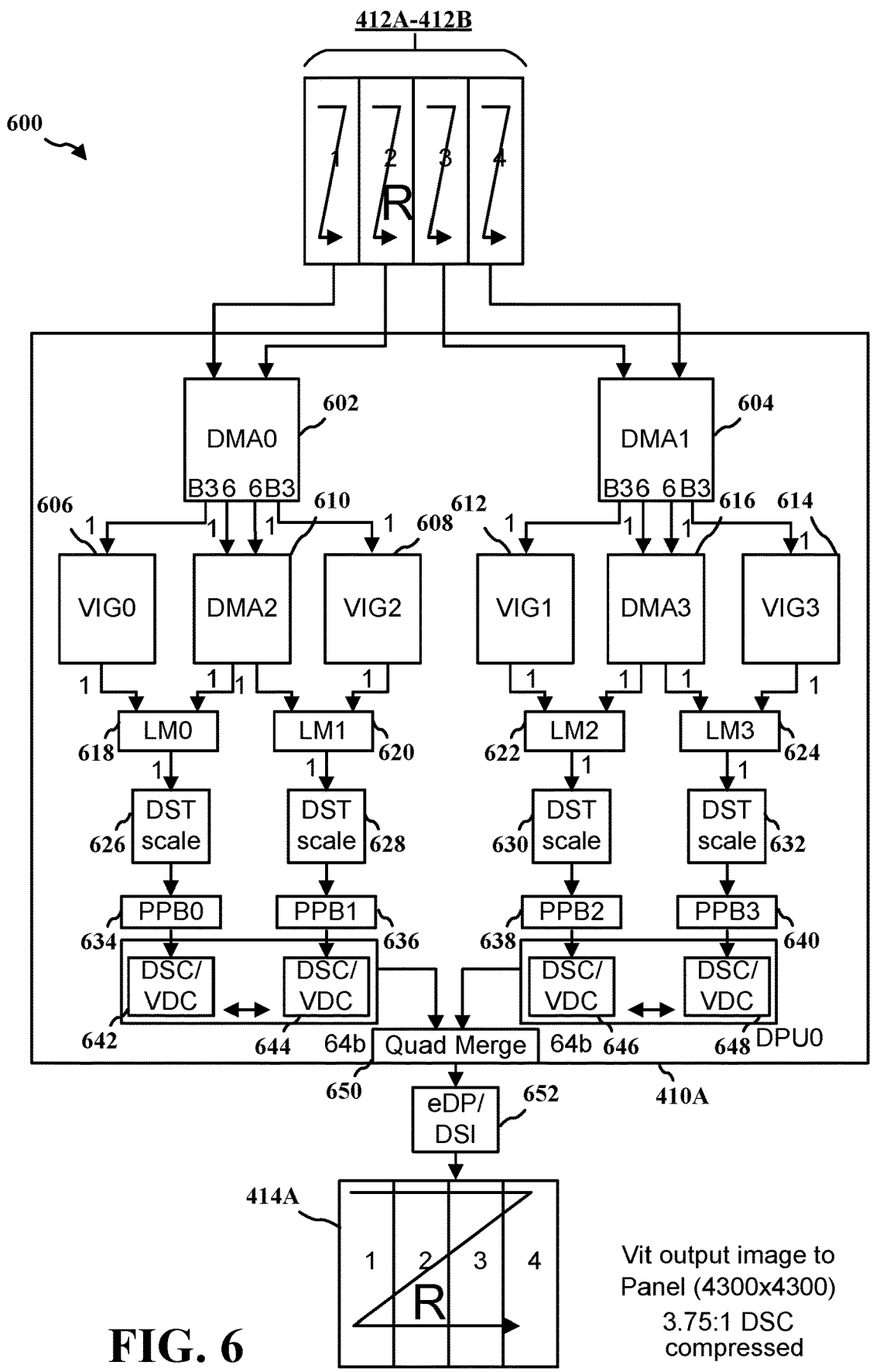
FIG. 6 is a diagram illustrating an example of a DPU pipeline associated with a first DPU.

FIG. 6 is a diagram 600 illustrating an example of a DPU pipeline associated with the first DPU 410A. The DPU pipeline may be associated with a four pixel per clock cycle throughput. The first DPU 410A may divide the first frame 404A (not illustrated in FIG. 6) into the first plurality of slices 412A-412B. The first DPU 410A may perform a first direct memory access (DMA) operation 602 with respect to a first subset of the first plurality of slices 412A-412B (e.g., two slices). DMA may refer to an operation whereby a DPU may directly pixel access double data rate (DDR) memory and send data for display without scaling. The first DPU 410A may perform a second DMA operation 604 with respect to a second subset of the first plurality of slices 412A-412B.

The first DPU 410A may perform a first VIG operation 606 on a first slice of the first subset of the first plurality of slices 412A-412B. A VIG operation may refer to an operation performed by a video input processing unit. The first DPU 410A may perform a second VIG operation 608 on a second slice of the first subset of the first plurality of slices 412A-412B. The first DPU 410A may perform a third DMA operation 610 with respect to the first subset of the plurality of slices 412A-412B.

The first DPU 410A may perform a third VIG operation 612 on a third slice of the second subset of the first plurality of slices 412A-412B. The first DPU 410A may perform a fourth VIG operation 614 on a fourth slice of the second subset of the first plurality of slices 412A-412B. The first DPU 410A may perform a fourth DMA operation 616 with respect to the first subset of the plurality of slices 412A-412B.

The first DPU 410A may perform a first layer mixer (LM) operation 618 on the first slice of the first subset of the first plurality of slices 412A-412B. A LM operation may refer to a per pixel mixing of pixels associated with different DMA operations and different VIG operations to produce a final output pixel. The first DPU 410A may perform a second LM operation 620 on the second slice of the first subset of the first plurality of slices 412A-412B. The first DPU 410A may perform a third LM operation 622 on the third slice of the second subset of the first plurality of slices 412A-412B. The first DPU 410A may perform a fourth LM operation 624 on the fourth slice of the second subset of the first plurality of slices 412A-412B.

The first DPU 410A may perform a first DST scaling operation 626 on the first slice of the first subset of the first plurality of slices 412A-412B. A DST scaling operation may refer to a scaling operation performed for an intended destination (e.g., a display panel) of a slice. The first DPU 410A may perform a second DST scaling operation 628 on the second slice of the first subset of the first plurality of slices 412A-412B. The first DPU 410A may perform a third DST scaling operation 630 on the third slice of the second subset of the first plurality of slices 412A-412B. The first DPU 410A may perform a fourth DST scaling operation 632 on the fourth slice of the second subset of the first plurality of slices 412A-412B.

The first DPU 410A may perform a first ping pong buffer (PPB) operation 634 on the first slice of the first subset of the first plurality of slices 412A-412B. PPB may refer to a memory storage system where two buffers are utilized in order to prevent inefficient memory access. For instance, ping pong buffering may be a manner of storing data/ memory in multiple buffers so that different parts of the system can utilize the multiple buffers simultaneously and without memory-access collision. The first DPU 410A may perform a second PPB operation 636 on the second slice of the first subset of the first plurality of slices 412A-412B. The first DPU 410A may perform a third PPB operation 638 on the third slice of the second subset of the first plurality of slices 412A-412B. The first DPU 410A may perform a fourth PPB operation 640 on the fourth slice of the second subset of the first plurality of slices 412A-412B.

The first DPU 410A may perform a first DSC/VDC operation 642 on the first slice of the first subset of the first plurality of slices 412A-412B. DSC may refer to display stream compression and VDC may refer to video display stream compression. The first DPU 410A may perform a second DSC/VDC operation 644 on the second slice of the first subset of the first plurality of slices 412A-412B. The first DPU 410A may merge an output of the first DSC/VDC operation 642 and an output of the second DSC/VDC operation 644. The first DPU 410A may perform a third DSC/VDC operation 646 on the third slice of the second subset of the first plurality of slices 412A-412B. The first DPU 410A may perform a fourth DSC/VDC operation 648 on the fourth slice of the second subset of the first plurality of slices 412A-412B. The first DPU 410A may merge an output of the third DSC/VDC operation 646 and an output of the fourth DSC/VDC operation 648.

The first DPU 410A may perform a quad merge operation 650 to merge the output of the first DSC/VDC operation 642 and the output of the second DSC/VDC operation 644 with the output of the third DSC/VDC operation 646 and the fourth DSC/VDC operation 648. A quad merge operation may refer to a concatenation of four separate processed display slices into a single combined display output. The first DPU 410A may provide an output of the quad merge operation 650 to an eDP interface/display serial interface (DSI) 652. The eDP interface/DSI 652 may output the first processed frame 414A.

Figure 7:
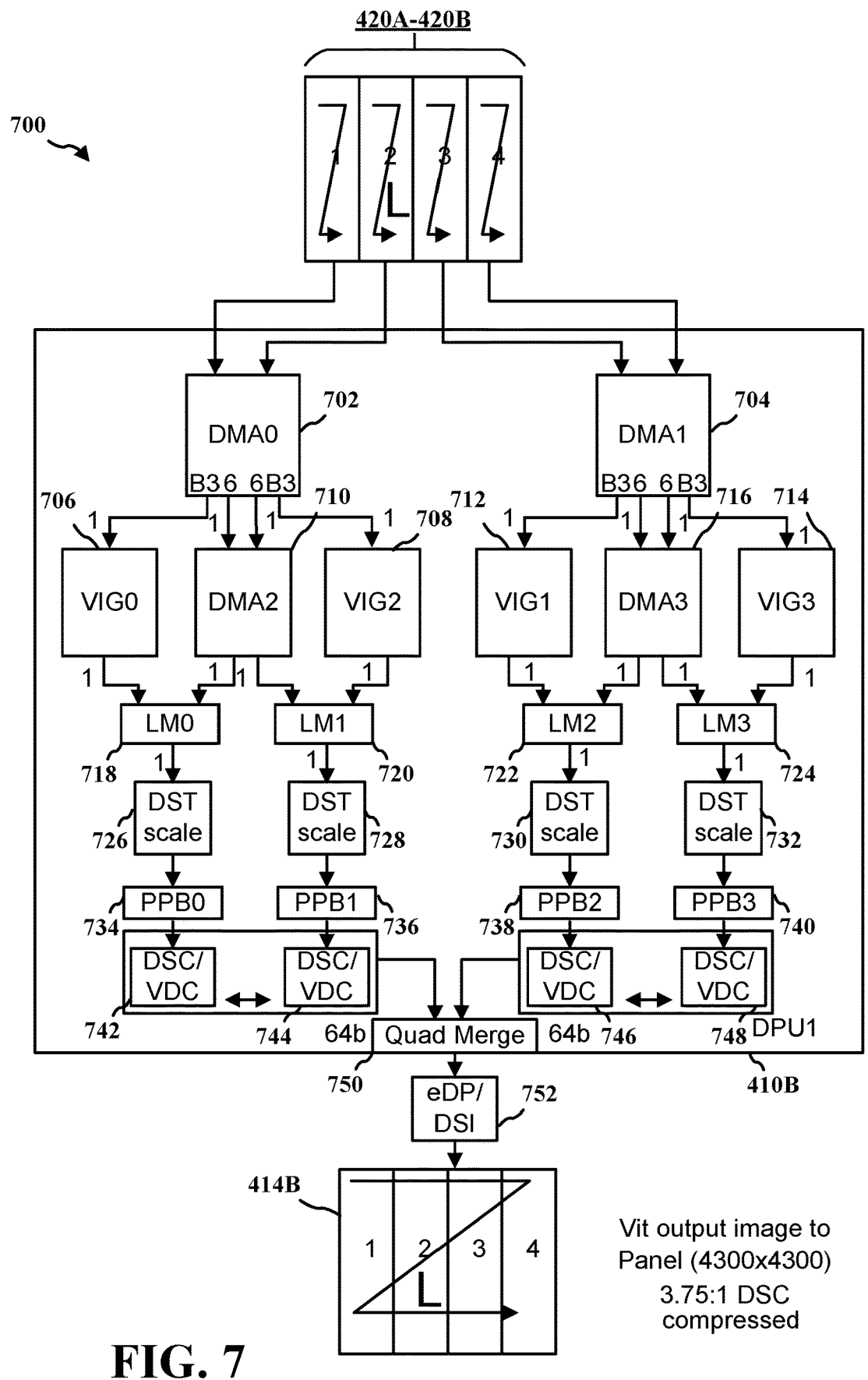
FIG. 7 is a diagram illustrating an example of a DPU pipeline associated with a second DPU.

FIG. 7 is a diagram 700 illustrating an example of a DPU pipeline associated with the second DPU 410B. The DPU pipeline may be associated with a four pixel per clock cycle throughput. The second DPU 410B may divide the second frame 404B (not illustrated in FIG. 6) into the second plurality of slices 420A-420B. The second DPU 410B may perform a first DMA operation 702 with respect to a first subset of the second plurality of slices 420A-420B (e.g., two slices). The second DPU 410B may perform a second DMA operation 704 with respect to a second subset of the second plurality of slices 420A-420B.

The second DPU 410B may perform a first VIG operation 706 on a first slice of the first subset of the second plurality of slices 420A-420B. The second DPU 410B may perform a second VIG operation 708 on a second slice of the first subset of the second plurality of slices 420A-420B. The second DPU 410B may perform a third DMA operation 710 with respect to the first subset of the second plurality of slices 420A-420B.

The second DPU 410B may perform a third VIG operation 712 on a third slice of the second subset of the second plurality of slices 420A-420B. The second DPU 410B may perform a fourth VIG operation 714 on a fourth slice of the second subset of the second plurality of slices 420A-420B. The second DPU 410B may perform a fourth DMA operation 716 with respect to the first subset of the second plurality of slices 420A-420B.

The second DPU 410B may perform a first LM operation 718 on the first slice of the first subset of the second plurality of slices 420A-420B. The second DPU 410B may perform a second LM operation 720 on the second slice of the first subset of the second plurality of slices 420A-420B. The second DPU 410B may perform a third LM operation 722 on the third slice of the second subset of the second plurality of slices 420A-420B. The second DPU 410B may perform a fourth LM operation 724 on the fourth slice of the second subset of the second plurality of slices 420A-420B.

The second DPU 410B may perform a first DST scaling operation 726 on the first slice of the first subset of the second plurality of slices 420A-420B. The second DPU 410B may perform a second DST scaling operation 728 on the second slice of the first subset of the second plurality of slices 420A-420B. The second DPU 410B may perform a third DST scaling operation 730 on the third slice of the second subset of the second plurality of slices 420A-420B. The second DPU 410B may perform a fourth DST scaling operation 732 on the fourth slice of the second subset of the second plurality of slices 420A-420B.

The second DPU 410B may perform a first PPB operation 734 on the first slice of the first subset of the second plurality of slices 420A-420B. The second DPU 410B may perform a second PPB operation 736 on the second slice of the first subset of the second plurality of slices 420A-420B. The second DPU 410B may perform a third PPB operation 738 on the third slice of the second subset of the second plurality of slices 420A-420B. The second DPU 410B may perform a fourth PPB operation 740 on the fourth slice of the second subset of the second plurality of slices 420A-420B.

The second DPU 410B may perform a first DSC/VDC operation 742 on the first slice of the first subset of the second plurality of slices 420A-420B. The second DPU 410B may perform a second DSC/VDC operation 744 on the second slice of the first subset of the second plurality of slices 420A-420B. The second DPU 410B may merge an output of the first DSC/VDC operation 742 and an output of the second DSC/VDC operation 744. The second DPU 410B may perform a third DSC/VDC operation 746 on the third slice of the second subset of the second plurality of slices 420A-420B.

The second DPU 410B may perform a fourth DSC/VDC operation 748 on the fourth slice of the second subset of the second plurality of slices 420A-420B. The second DPU 410B may merge an output of the third DSC/VDC operation 746 and an output of the fourth DSC/VDC operation 748.

The second DPU 410B may perform a quad merge operation 750 to merge the output of the first DSC/VDC operation 742 and the output of the second DSC/VDC operation 744 with the output of the third DSC/VDC operation 746 and the fourth DSC/VDC operation 748. The second DPU 410B may provide an output of the quad merge operation 750 to an eDP interface/DSI 752. The eDP interface/DSI 752 may output the second processed frame 414B.

Figure 8:
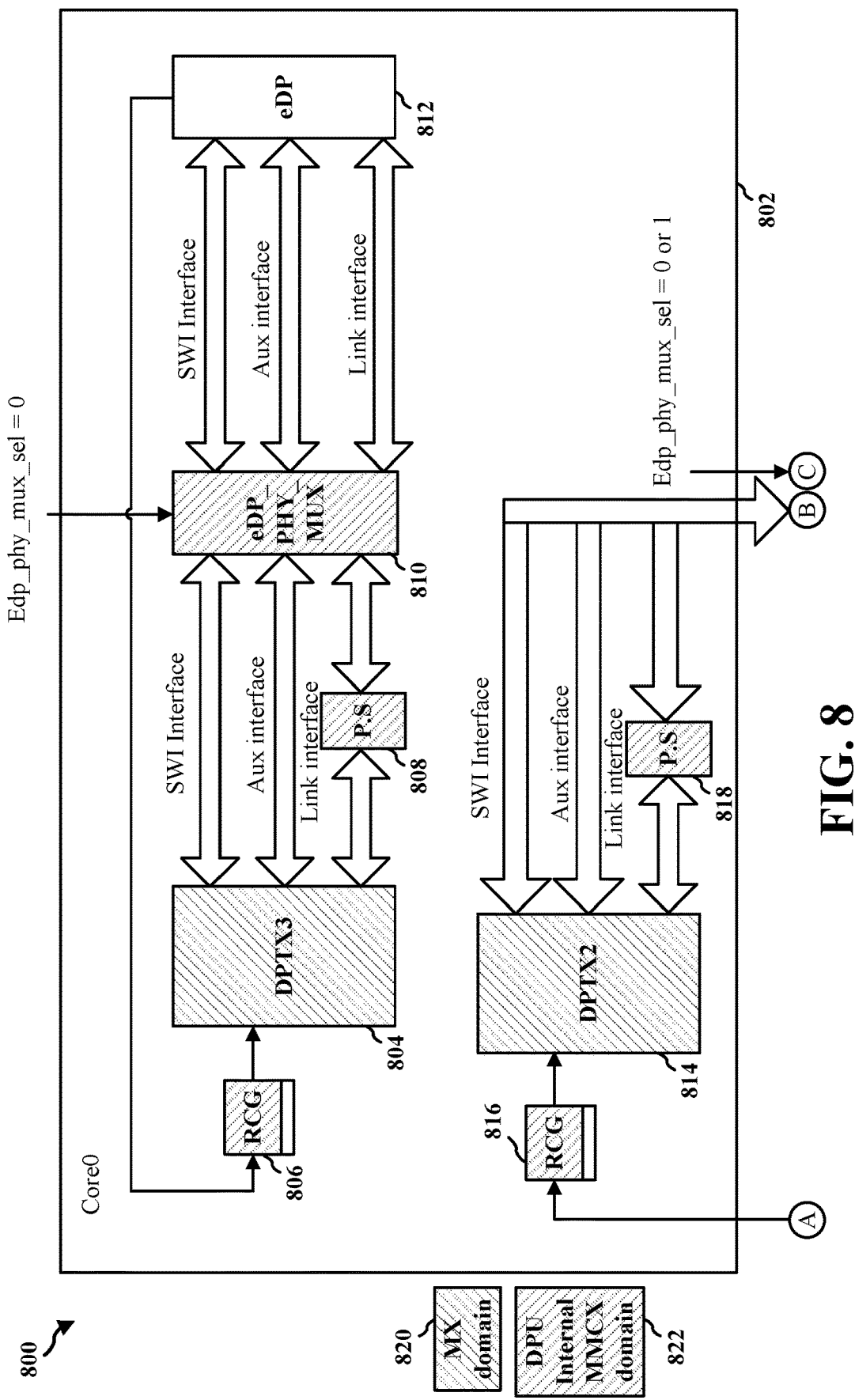
FIG. 8 is a diagram illustrating an example of a first DPU core.

FIG. 8 is a diagram 800 illustrating an example of a first DPU core 802. In an example, the first DPU core 802 may be included in the first DPU 410A. The first DPU core 802 may include a first controller 804 (referred to in FIG. 8 as "DPTX3"), a first root clock gate (RCG) 806, a first power switch (P.S) 808, a multiplexer 810 (referred to in FIG. 8 as "eDP_PHY_MUX"), and an eDP link 812 (referred to in FIG. 8 as "eDP"). A RCG may turn a clock on or off to a hardware block. In an example, if a hardware block is not being utilized, the RCG may be turned off to conserve power. The first DPU core 802 may also include a second controller 814 (referred to in FIG. 8 as "DPTX2"), a second RCG 816, and a second P.S 818. The eDP link 812 may also be referred to as an eDP interface. The eDP link 812 may be associated with a first display (or a first part of a display). In an example, the first display may be the first display 406A. The multiplexer 810 may correspond to the eDP XBAR 418. In an example, the first controller 804 may correspond to the first eDP controller 416 of the first DPU 410A and the second controller 814 may correspond to the second eDP controller 424 of the first DPU 410A.

The first controller 804 may be coupled to the multiplexer 810 via a software interface (SWI) interface and an auxiliary interface. The SWI interface may be associated with software. The auxiliary interface may be an eDP auxiliary data channel. The first controller may additionally be coupled to the multiplexer 810 via the first P.S 808 and a link interface. The link interface may be an eDP main data link channel. The first controller 804 may also be coupled to the first RCG 806. The multiplexer 810 may be coupled to the eDP link 812 via the SWI interface, the auxiliary interface, and the link interface. The eDP link 812 may be coupled to the first RCG 806.

The second controller 814 may be coupled to the second RCG 816. The first RCG 806, the second RCG 816, the first P.S 808, the second P.S 818, and the multiplexer 810 may be associated with a MX domain 820. The MX domain 820 may refer to a SOC internal static random-access memory (SRAM) voltage domain. The first controller 804 and the second controller 814 may be associated with a DPU internal MMCX domain 822. MMCX may refer to a multimedia logic voltage domain.

Figure 9:
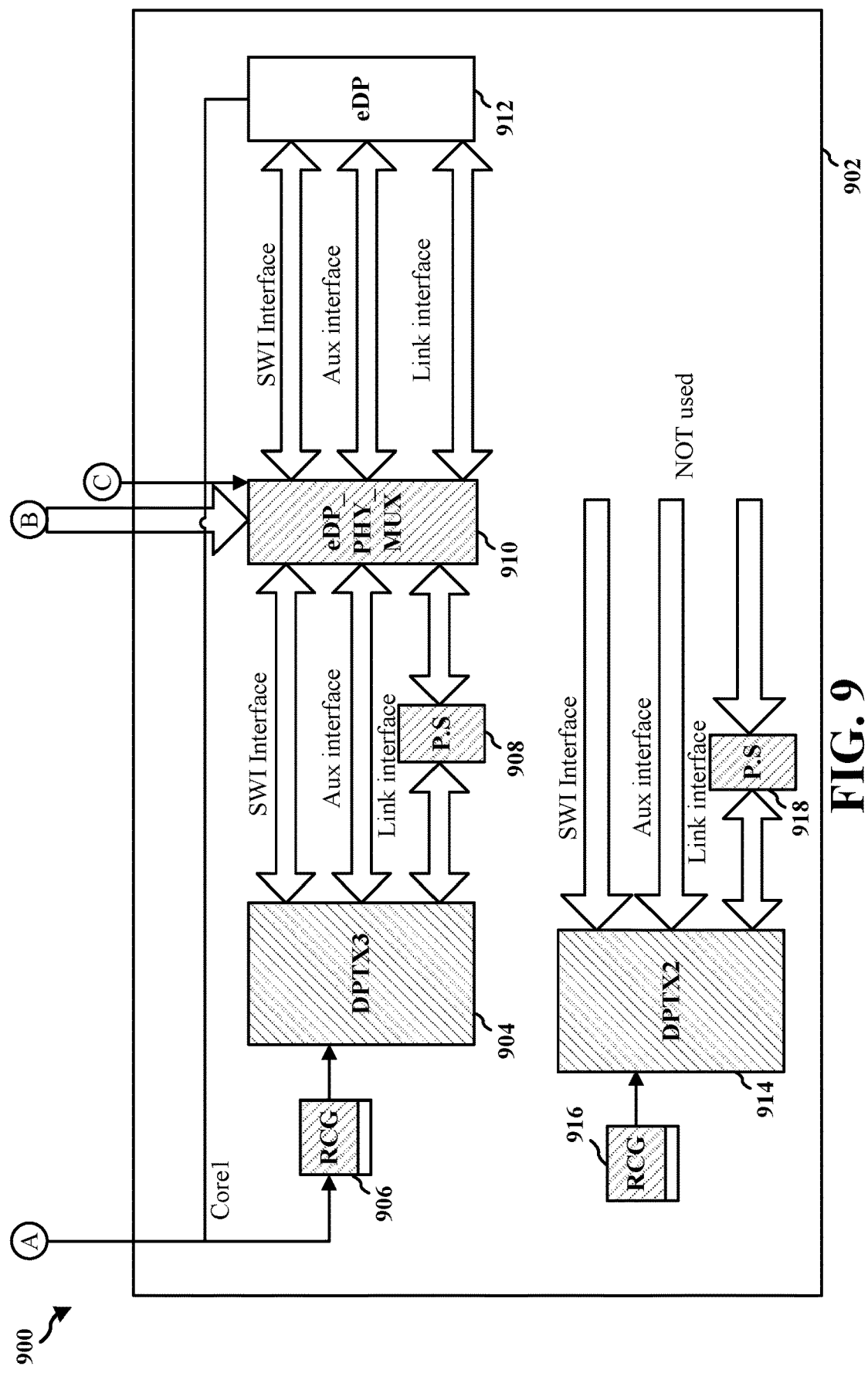
FIG. 9 is a diagram illustrating an example of a second DPU core.

FIG. 9 is a diagram 900 illustrating an example of a second DPU core 902. In an example, the second DPU core 902 is included in the first DPU 410A. The second DPU core 902 may include a first controller 904 (referred to in FIG. 9 as "DPTX3"), a first RCG 906, a first P.S 908, a multiplexer 910 (referred to in FIG. 9 as "eDP_PHY_MUX"), and an eDP link 912 (referred to in FIG. 8 as "eDP"). The eDP link 812 may also be referred to as an eDP interface. The eDP link 912 may be associated with a second display (or a second part of a display). In an example, the second display may be the second display 406B. The second DPU core 902 may also include a second controller 914 (referred to in FIG. 9 as "DPTX2"), a second RCG 916, and a second P.S 918. In one aspect, the second controller 914, the second RCG 916, and the second P.S 918 may not be utilized during operation of the second DPU core 902. The multiplexer 910 may correspond to the eDP XBAR 418. In an example, the first controller 904 may correspond to the eDP controller 422 of the second DPU 410B.

The first controller 904 may be coupled to the multiplexer 910 via a SWI interface and an auxiliary interface. The first controller 904 may additionally be coupled to the multiplexer 910 via the first P.S 908 and a link interface. The first controller 904 may also be coupled to the first RCG 906. The multiplexer 910 may be coupled to the eDP link 912 via the SWI interface, the auxiliary interface, and the link interface. The eDP link 912 may be coupled to the first RCG 906.

The second controller 914 may be coupled to the second RCG 916. The first RCG 906, the second RCG 916, the first P.S 908, the second P.S 918, and the multiplexer 910 may be associated with the MX domain 820. The first controller 904 and the second controller 914 may be associated with the DPU internal MMCX domain 822. The first DPU core 802 and the second DPU core 902 may be part of a SOC.

Referring jointly now to FIGS. 8 and 9, the second RCG 816 of the first DPU core 802 may be coupled to the first RCG 906 of the second DPU core 902 (indicated in FIGS. 8 and 9 by "A"). The second controller 814 may be coupled to the multiplexer 910 of the second DPU core 902 by the SWI interface and the auxiliary interface (indicated in FIGS. 8 and 9 by "B"). The second controller 814 may also be coupled to the multiplexer 910 by the link interface and via the second P.S 818 (also indicated in FIGS. 8 and 9 by "B").

In an example, the first DPU core 802 may serve as a primary DPU. As such, the multiplexer 810 may receive an indication that the first DPU core 802 is to serve as the primary DPU (e.g., "Edp_phy_mux_sel=0"). The first DPU core 802 may provide an indication to the multiplexer 910 of the second DPU core 902 (illustrated in FIGS. 8 and 9 as "C") indicating whether the second DPU core 902 is to drive the eDP link 912 of the second DPU core 902 (e.g., "Edp_phy_mux_sel=0") or whether the second controller 814 of the first DPU core 802 is to drive the eDP link 912 of the second DPU core 902 (e.g., "Edp_phy_mux_sel=1"). The multiplexer 910 may also receive data/signals from the second controller 814 via the SWI interface, the auxiliary interface, and the link interface. In an example, a value of "Edp_phy_mux_sel" may be software controllable. For instance, the value of "Edp_phy_mux_sel" may be set in a software register.

In an example in which high resolution UC (e.g., UC associated with the high throughput DPU configuration described above in the description of FIG. 4) is to be displayed, "Edp_phy_mux_sel" may be set to "0." In the example, both the first DPU core 802 and the second DPU core 902 may be in an "ON" state. The first controller 804 of the first DPU core 802 may drive the eDP link 812 and the first controller 904 of the second DPU core 902 may drive the eDP link 912 based on a signal output by the multiplexer 910, where the signal may be based on "Edp_phy_mux_sel" being set to "0." For instance, the first controller 804 may cause first UC to be displayed on a first display (or a first part of a single display) and the first controller 904 may cause second UC to be displayed on a second display (or a second part of the single display).

In an example in which low resolution UC (e.g., UC associated with the low throughput DPU configuration described above in the description of FIG. 5) is to be displayed, "Edp_phy_mux_sel" may be set to "1." In the example, the first DPU core 802 may be in an "ON" state and the second DPU core 902 may be in a GDS power collapsed state. The first controller 804 of the first DPU core 802 may drive the eDP link 812. The second controller 814 of the first DPU core 802 may drive the eDP link 912 based on a signal output by the multiplexer 910, where the signal may be based on "Edp_phy_mux_sel" being set to "1." For instance, the first controller 804 may cause first UC to be displayed on a first display (or a first part of a single display) and the second controller 814 may cause second UC to be displayed on a second display (or a second part of the single display). In one aspect, a clock from a phased locked loop (PLL) associated with the eDP link 912 may be routed to the first RCG 906 and the second RCG 816.

Figure 10:
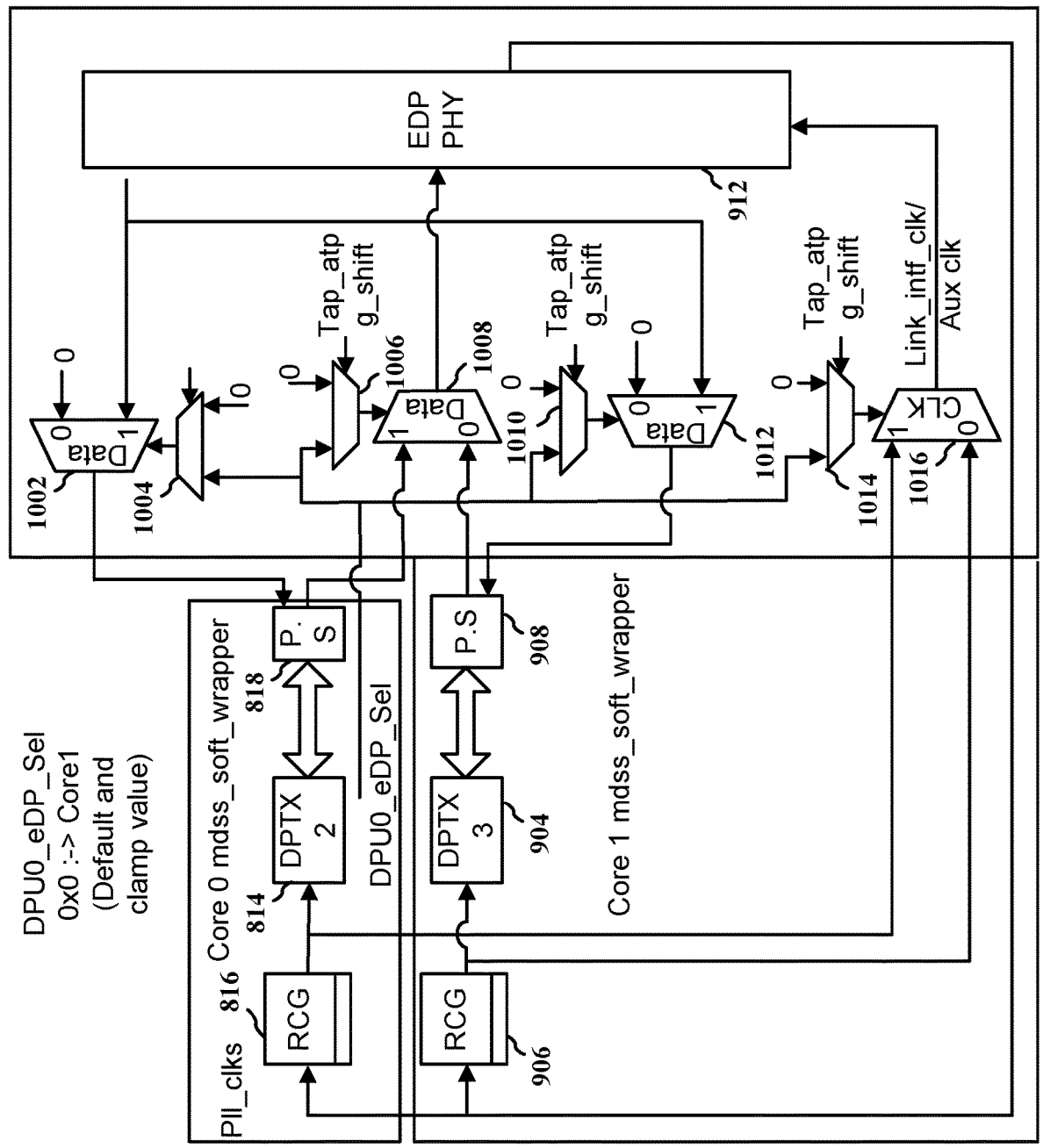
FIG. 10 is a diagram illustrating an example of a multiplexer (MUX).

FIG. 10 is a diagram 1000 illustrating an example implementation of the multiplexer 910. As depicted in FIG. 10, the multiplexer 910 may include a first multiplexer 1002, a second multiplexer 1004, a third multiplexer 1006, a fourth multiplexer 1008, a fifth multiplexer 1010, a sixth multiplexer 1012, a seventh multiplexer 1014, and an eighth multiplexer 1016 (collectively "the plurality of multiplexers 1002-1016). In general, a multiplexer in the plurality of multiplexers 1002-1016 may be configured to receive data/signals (indicated in FIG. 10 by an arrow entering into the multiplexer) from various sources as input (e.g., other multiplexers in the plurality of multiplexers, the second P.S 818, the first P.S. 908, the second RCG 816, the first RCG 906, the eDP link 912, various software registers (such as a software register associated with "Edp_phy_mux_sel"), display drivers, etc.). The multiplexer in the plurality of multiplexers 1002-1016 may be configured to output data or a signal (indicated in FIG. 10 by an arrow exiting from the multiplexer) based on the input.

Figure 11:
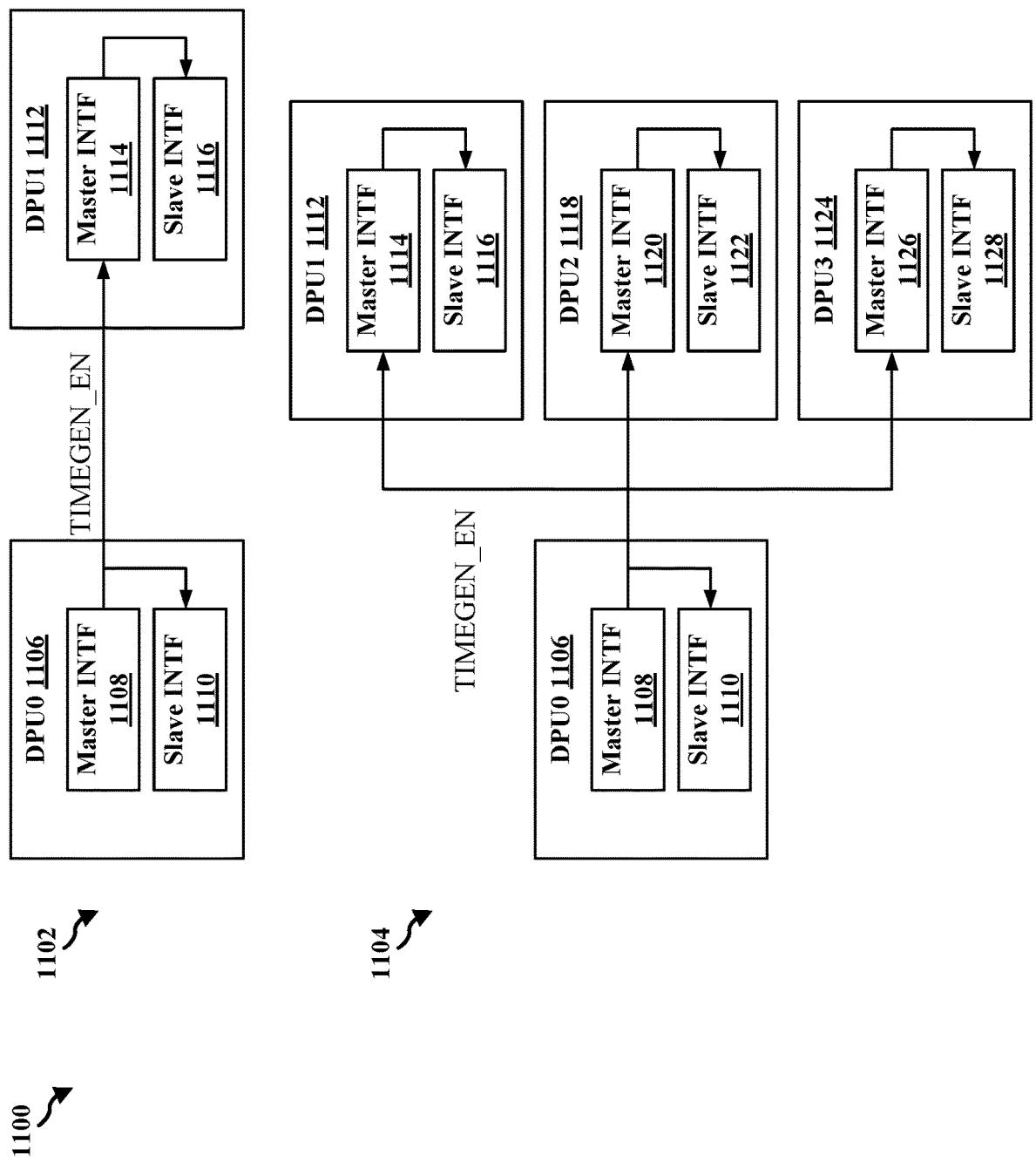
FIG. 11 is a diagram illustrating examples of interfaces of DPU cores.

FIG. 11 is a diagram 1100 illustrating examples of interfaces of DPU cores. The diagram 1100 depicts a first example 1102 and a second example 1104. The first example 1102 may include a first DPU 1106 (referred to in FIG. 11 as "DPU0"). The first DPU 1106 may be referred to as a "Master DPU." The first DPU 1106 may include a master interface 1108 (referred to in FIG. 11 as "Master INTF") and a slave interface 1110 (referred to in FIG. 11 as "Slave INTF"). The master interface 1108 and the slave interface 1110 may drive multiple display panels (or different portions of the same display panel). In a scenario with high resolution UC, multiple interfaces (e.g., multiple master interfaces and slave interfaces) may be used to drive a single panel. In an example, the master interface 1108 may drive a first half of a frame that is to be displayed and the slave interface 1110 may drive a second half of the frame. The master interface 1108 may be configured to provide a timing (e.g., "TIMEGEN_EN") to the slave interface 1110 such that the first half of the frame and the second half of the frame are displayed properly. Stated differently, the master interface 1108 may enable a timing engine of the slave interface 1110. The first DPU 1106 may be or include the first DPU 410A and/or the first DPU core 802.

The first example 1102 may also include a second DPU 1112 (referred to in FIG. 11 as "DPU1"). The second DPU 1112 may be referred to as a "Slave DPU." The second DPU 1112 may include a master interface 1114 and a slave interface 1116. The master interface 1114 and the slave interface 1116 may drive multiple display panels. The master interface 1108 of the first DPU 1106 may provide the timing to the master interface 1114 of the second DPU 1112. The master interface 1114 of the second DPU 1112 may be configured to receive the timing (e.g., "TIMEGEN_EN") from the master interface 1108 of the first DPU 1106. Stated differently, the master interface 1108 of the first DPU 1106 may enable a timing engine of the master interface 1114 of the second DPU 1112. The master interface of the second DPU 1112 may be configured to accept "TIMEGEN_EN" via a multiplexer (e.g., "TIMING_EN_MUX"). Thus, the second DPU 1112 may follow the timing of the first DPU 1106. The master interface 1114 of the second DPU 1112 may be configured to provide the timing (e.g., "TIMEGEN_EN") to the slave interface 1116 of the second DPU 1112. Stated differently, the master interface 1114 may enable a timing engine of the slave interface 1116. The second DPU 1112 may be or include the second DPU 410B and/or the second DPU core 902.

In one aspect, a video timing of the master interface 1108 of the first DPU 1106 may be ahead of a video timing of the master interface 1114 of the second DPU 1112. In one aspect, a delay/skew between the first DPU 1106 and the second DPU 1112 may be software controllable. In one aspect, the first DPU 1106 and the second DPU 1112 may be associated with a first software register (e.g., "DPU_SYNC_PROG_INTF_OFFSET_EN"). The first software register may have a field that may take a value. The value may be a 32-bit value (e.g., bit position 31: bit position 0). In an example, the value may have a default value of "0xFFFFFFFF." The first software register may refer to a programmable offset (in processor clock (pclk) cycles to enable other timing engines in slave DPUs (e.g., the second DPU 1112). The value of the first register may not be double buffered. In one aspect, the first DPU 1106 and the second DPU 1112 may be associated with a second software register (e.g., "TIMING_EN_MUX"). The second software register may have a field that is indicative of a selection. The field may have a 1-bit value (e.g., bit position 0). The second software register may select a timing engine to enable. In an example, when the second software register is set to a "0" bit, a DPU (e.g., the second DPU 1112) may follow a timing of an internal register (e.g., "TIMING_ENGINE_EN") of the DPU. When the software register is set to a "1" bit, a DPU (e.g., the second DPU 1112) may follow a timing of a master DPU (e.g., the first DPU 1106).

The second example 1104 may also include the first DPU 1106 and the second DPU 1112 described above. The second example 1104 may have similar functionality as the first example 1102 described above. However, in the second example 1104, the master interface 1108 of the first DPU 1106 may additionally provide the timing to a master interface 1120 of a third DPU 1118 (referred to in FIG. 11 as "DPU2") and a master interface 1126 of a fourth DPU 1124 (referred to in FIG. 11 as "DPU3"). The master interface 1120 of the third DPU 1118 may be configured to provide the timing (described above) to a slave interface 1122 of the third DPU 1118 and the master interface 1126 of the fourth DPU 1124 may be configured to provide the timing to a slave interface 1128 of the fourth DPU 1124.

Figure 12:
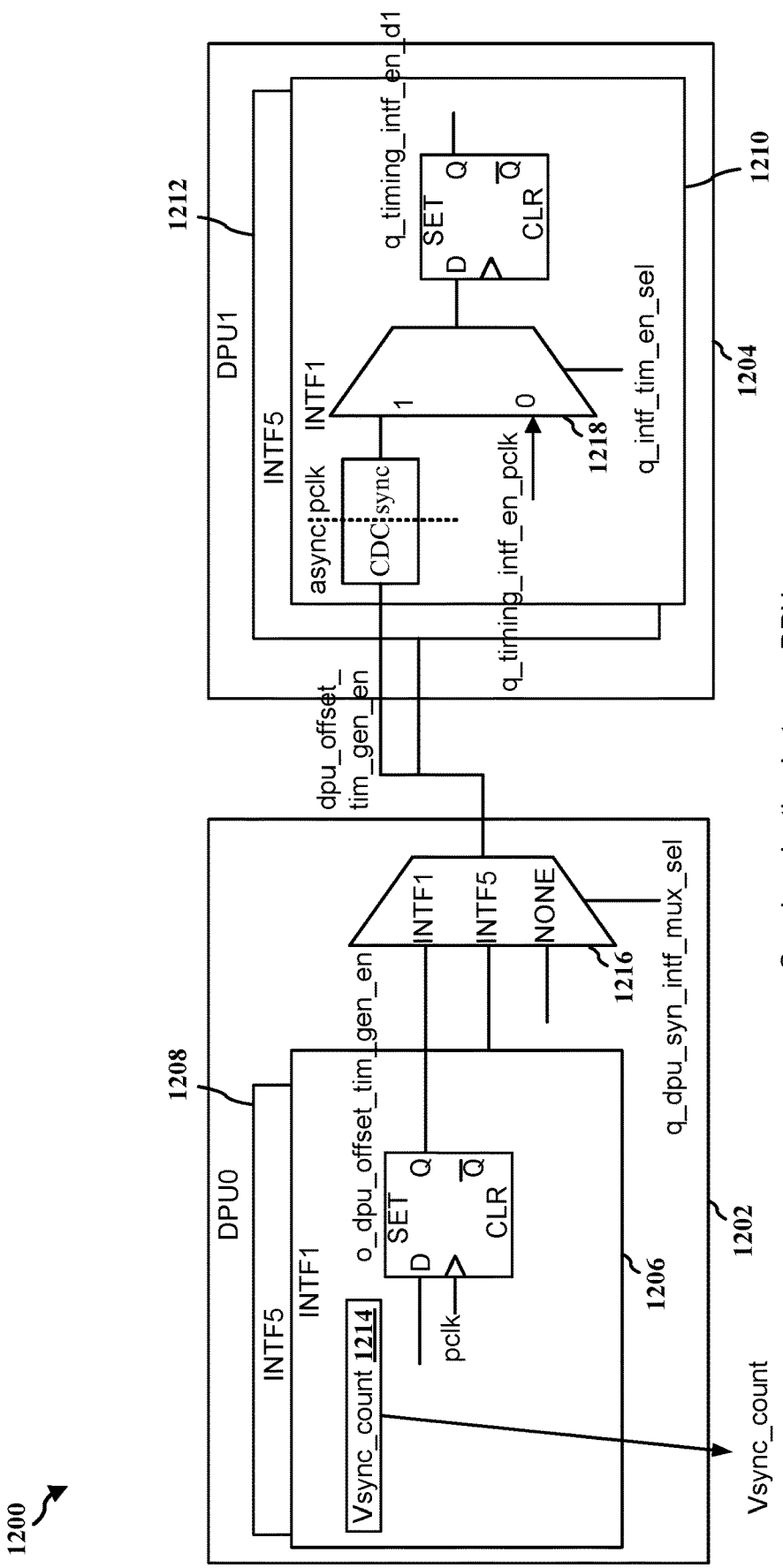
FIG. 12 is a diagram illustrating an example of timing synchronization between DPU cores.

FIG. 12 is a diagram 1200 illustrating an example of timing synchronization between DPU cores. The diagram 1200 depicts a first DPU core 1202 (referred to in FIG. 12 as "DPU0") and a second DPU core 1204 (referred to in FIG. 12 as "DPU1"). In an example, the first DPU core 1202 may correspond to the first DPU 1106 and the second DPU core 1204 may correspond to the second DPU 1112. The first DPU core 1202 may include a first interface 1206 (referred to in FIG. 12 as "INTF1") and a second interface 1208 (referred to in FIG. 12 as "INTF5"). In an example, the first interface 1206 may correspond to the master interface 1108 and the second interface 1208 may correspond to the slave interface 1110. The second DPU core 1204 may include a first interface 1210 (referred to in FIG. 12 as "INTF1") and a second interface 1212 (referred to in FIG. 12 as "INTF5"). In an example, the first interface 1210 may correspond to the master interface 1114 and the second interface 1212 may correspond to the slave interface 1116.

The first interface 1206 of the first DPU core 1202 may be associated with a counter 1214 (referred to in FIG. 12 as "Vsync count"). The counter 1214 may be associated with a timing engine of the first DPU core 1202. The counter 1214 may count a number of clock cycles for each frame that is to be displayed. The counter 1214 may be a vertical synchronization (Vsync) timer. Vsync timing is a means to synchronize the frame rate of an application (e.g., a video game) with the refresh rate of a corresponding display or monitor. DPUs, GPUs, and/or applications may utilize Vsync timing to eliminate certain visual artifacts, such as screen tearing (i.e., a split in a portion of a displayed frame, where a portion of the frame lags behind the other portions). When the counter 1214 reaches a programmable value (referred to in FIG. 12 as "Q_DPU_SYNC_PROG_INTF_OFFSET_EN_VALUE0"), the first interface 1206 may drive an output signal (referred to in FIG. 12 as "o_dpu_offset_time_gen_en") to the second DPU core 1204 (i.e., a slave DPU core) that enables a timing engine. The programmable value may correspond to a value of the first software register ("DPU_SYNC_PROG_INTF_OFFSET_EN") described above. The programmable value may be an offset value.

In an example, the first DPU core 1202 may include a first multiplexer 1216. The first multiplexer 1216 may select an active display timing interface from multiple possible display timing interfaces and output signals associated with the selected timing interfaces to the second DPU core 1204. The first multiplexer 1216 may receive the output signal (o_dpu_offset_time_gen_en) and another output signal from the second interface 1208. The first multiplexer may also receive "q_dpu_syn_intf_mux_sel," which may refer to a signal in hardware that selects which timing interface is active. The multiplexer may output a signal (referred to in FIG. 12 as "dpu_offset_time_gen_en") that enables the timing engine to the first interface 1210 and the second interface 1212 of the second DPU core 1204. For instance, "dpu_offset_time_gen_en" may refer to a hardware function that can be enabled by software that makes a display timing generated by two timing interfaces have a fixed offset in time.

The first interface 1210 of the second DPU core 1204 may receive the signal output from the first DPU core 1202. The first interface 1210 may include a second multiplexer 1218. The second multiplexer 1218 may accept a timing engine enable from the first interface 1206 of the first DPU core 1202 (e.g., "dpu_offset_time_gen_en") or the second multiplexer 1218 may accept a timing engine ("q_timing_intf_enpclk") from an internally generated timing engine. As illustrated in FIG. 12, "q_intf_tim_en_sel" may be a hardware function. For instance "q_timing_intf_en_pclk" may be a hardware function that synchronizes a start of two timing interfaces. The incoming signal ("dpu_offset_time_gen_en") may be synchronized to a pclk domain and used as a timing engine enable.

Figure 13:
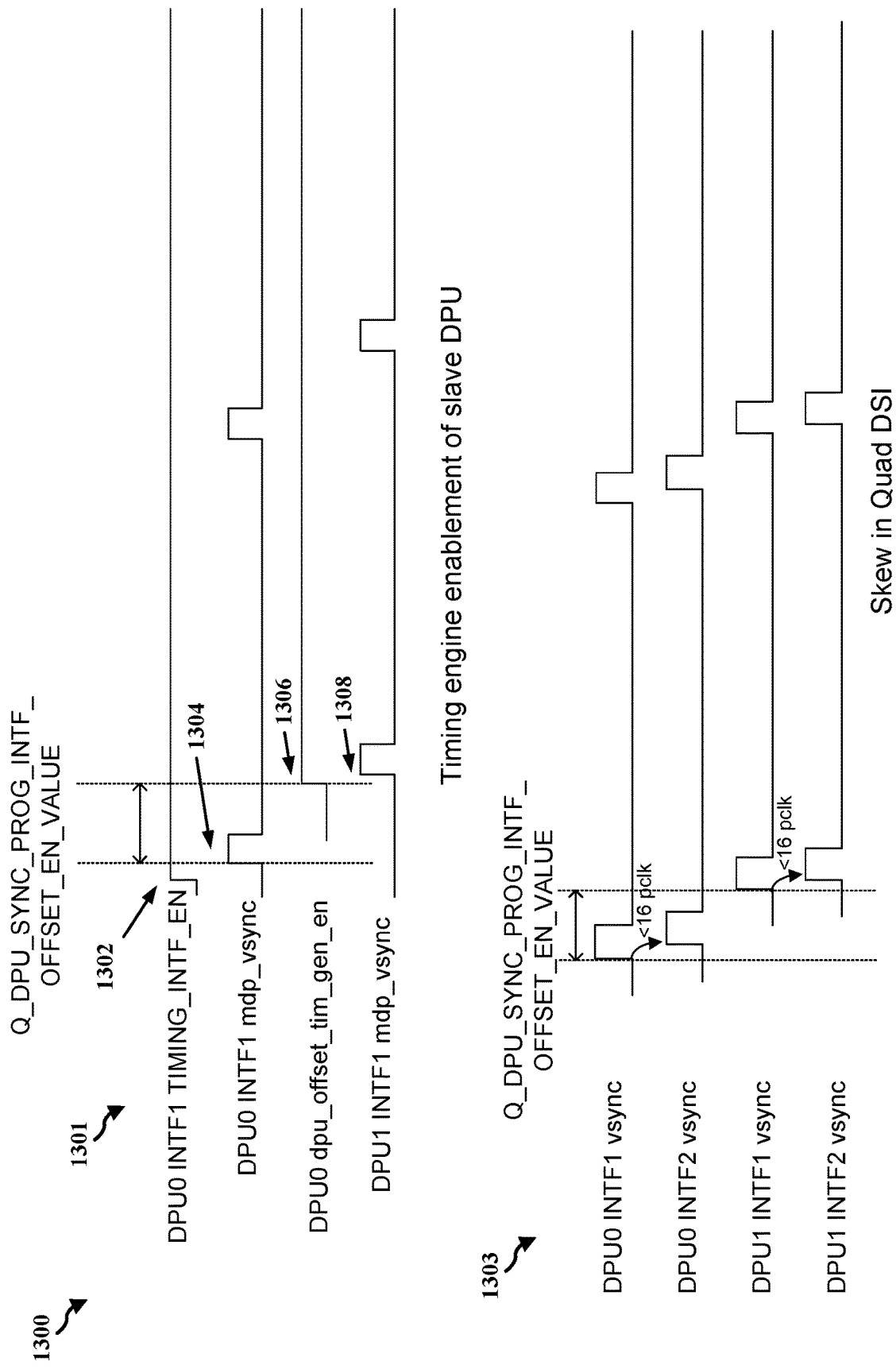
FIG. 13 is a diagram illustrating examples of timings between different DPU interfaces.

FIG. 13 is a diagram 1300 illustrating examples of timings between different DPU interfaces. The diagram 1300 depicts a first example 1301 of synchronizing dual DPU cores. At 1302 a timing engine of the first interface 1206 (i.e., a master interface) of the first DPU core 1202 may be enabled. At 1304, the counter 1214 may begin to run. In an example, 1304 may correspond to a start of a frame on the first DPU core 1202. At 1306, the counter 1214 may reach a programmable value ("Q_DPU_SYNC_PROG_INTF_OFFSET_EN_VALUE") defined in the first software register ("DPU_SYNC_PROG_INTF_OFFSET_EN") described above and the first interface 1206 may output the signal ("dpu_offset_time_gen_en") described above. At 1308, a second counter (not illustrated in FIG. 12) associated with the first interface 1210 of the second DPU core 1204 may begin to run based on the first interface 1210 receiving the signal. In an example, 1308 may correspond to a start of a frame on the second DPU core 1204. Stated differently, a relative skew between the counter 1214 (i.e., a Vsync counter of the first DPU core 1202) and the second counter (i.e., a Vsync counter of the second DPU core 1204) may be offset by the programmable value ("Q_DPU_SYNC_PROG_INTF_OFFSET_EN_VALUE").

The diagram 1300 also depicts a second example 1303 in which each DPU core includes two DSI interfaces. The second example 1303 depicts an example of timing relationships between a first interface of a first DPU core, a second interface of the first DPU core, a first interface of a second DPU core, and a second interface of the second DPU core. The second example 1303 may be associated with the first example 1102 described above.

Figure 14:
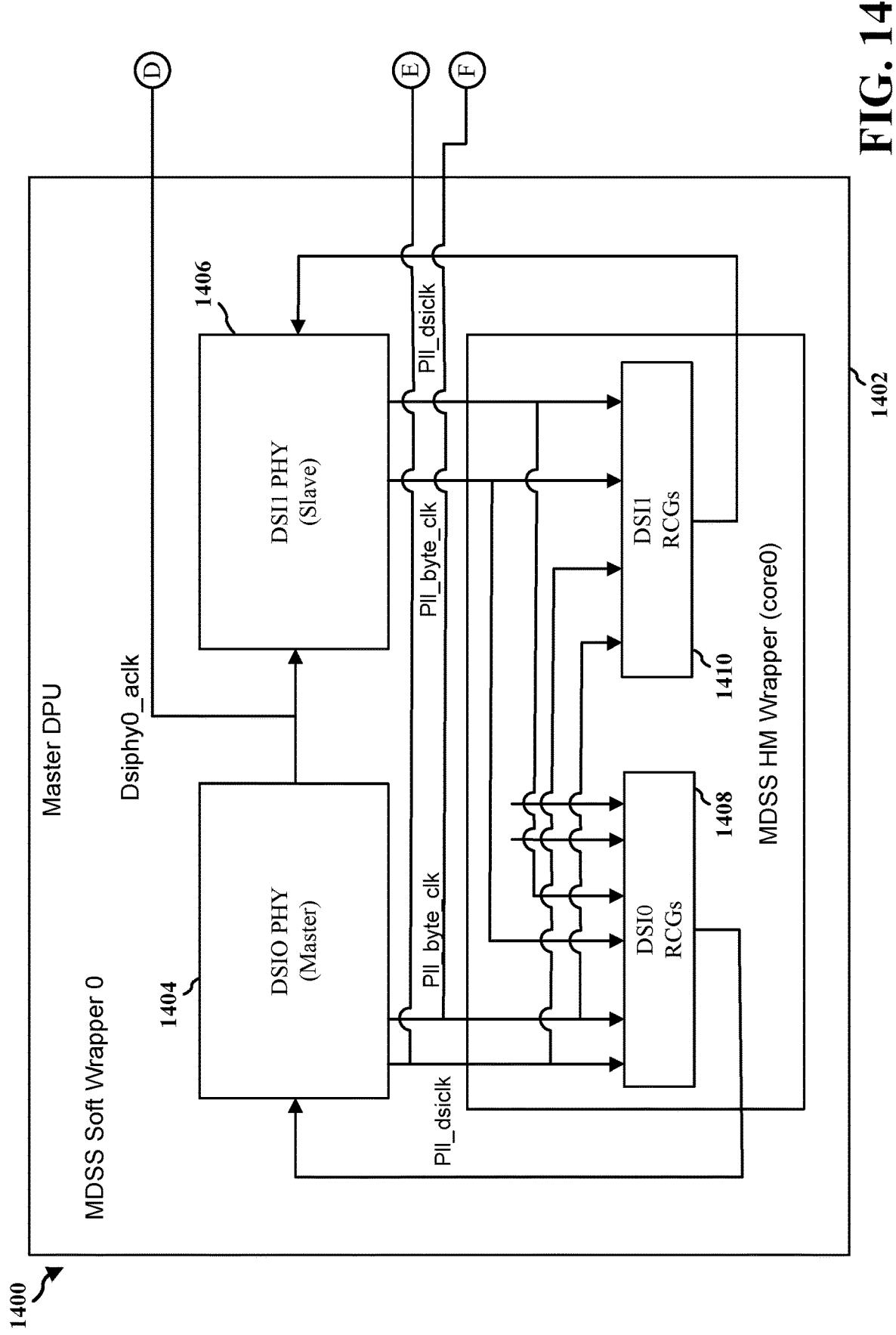
FIG. 14 is a diagram illustrating example aspects of clock synchronization with respect to a master DPU.

FIG. 14 is a diagram 1400 illustrating example aspects of clock synchronization with respect to a master DPU 1402. The master DPU 1402 may be the first DPU 410A or the first DPU 1106. The master DPU 1402 may include the first DPU core 802 or the first DPU core 1202. The master DPU 1402 may include a master physical DSI 1404 (referred to in FIG. 14 as "DSI0 PHY (Master)") and a slave physical DSI 1406 (referred to in FIG. 14 as "DSI1 PHY (Slave)"). A master interface may generate a clock that is fed to both the master physical DSI 1404 and the slave physical DSI 1406 such that both the master physical DSI 1404 and the slave physical DSI 1406 may run/execute in sync in terms of display timing. The master DPU 1402 may include first DSI RCGs 1408 referred to in FIG. 14 as "DSI0 RCGs") and second DSI RCGs 1410 (referred to in FIG. 14 as "DSI1 RCGs").

Figure 15:
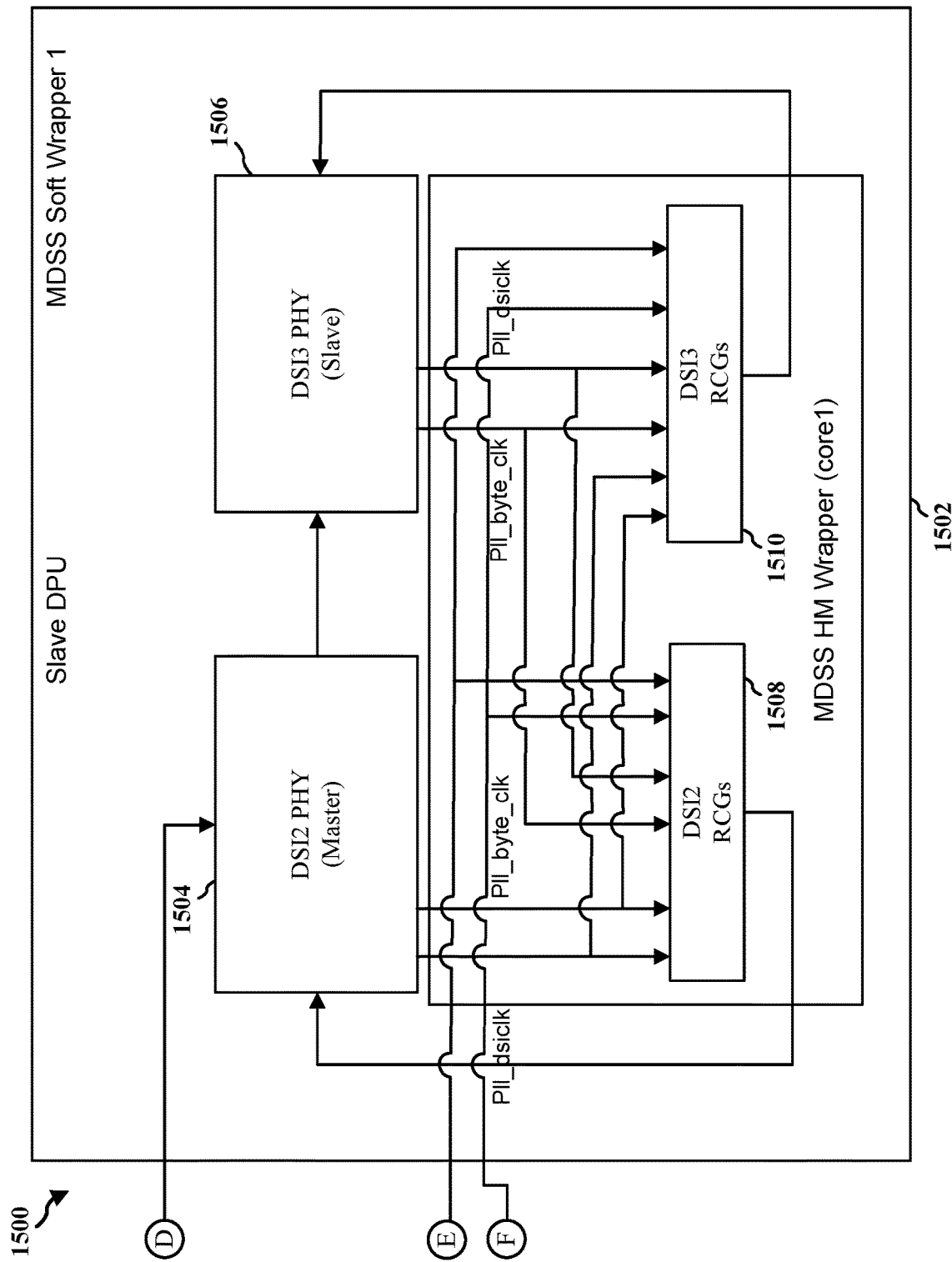
FIG. 15 is a diagram illustrating example aspects of clock synchronization with respect to a slave DPU.

FIG. 15 is a diagram 1500 illustrating example aspects of clock synchronization with respect to a slave DPU 1502. The slave DPU 1502 may be the second DPU 410B or the second DPU 1112. The slave DPU 1502 may include the second DPU core 902 or the second DPU core 1204. The slave DPU 1402 may include a master physical DSI 1504 (referred to in FIG. 14 as "DSI2 PHY (Master)") and a slave physical DSI 1506 (referred to in FIG. 14 as "DSI3 PHY (Slave)"). The master DPU 1502 may include first DSI RCGs 1508 (referred to in FIG. 14 as "DSI2 RCGs") and second DSI RCGs 1510 (referred to in FIG. 14 as "DSI3 RCGs").

Referring jointly now to FIGS. 14 and 15, the master physical DSI 1404 of the master DPU 1402 may be coupled to the master physical DSI 1504 of the slave DPU 1502 (indicated in FIGS. 14 and 15 by "D"). The master physical DSI 1404 of the master DPU 1402 may be coupled to the first DSI RCGs 1508 and the second DSI RCGs 1510 of the slave DPU 1502 via a first connection (indicated in FIGS. 14 and 15 by "E"). The master physical DSI 1404 of the master DPU 1402 may also be coupled to the first DSI RCGs 1508 and the second DSI RCGs 1510 of the slave DPU 1502 via a second connection (indicated in FIGS. 14 and 15 by "F").

The master physical DSI 1404 of the master DPU 1402 may be configured to provide "Disphy0_aclk" to the master physical DSI 1504 of the slave DPU 1502, where "Disphy0_aclk" may refer to a DSI clock that is sent between the master physical DSI 1404 and the master physical DSI 1504. The master physical DSI 1404 may also be configured to provide "Pll_dsiclk" to the first DSI RCGs 1508 and the second DSI RCGs 1510 of the slave DPU 1502 via the first connection. In an example, "Pll_dsiclk" may be a DSI clock output from a DSI PHY to a DSI clock controller/clock generator. The master physical DSI 1404 may also be configured to provide "Pll_byte_clk" to the first DSI RCGs 1508 and the second DSI RCGs 1510 of the slave DPU 1502 via the second connection. In an example, "Pll_byte_clk" may refer to a clock used by a DSI controller to transmit a DSI data stream from a DSI controller to a DSI PHY. In one aspect, a pixel clock may be generated from a master physical phased lock loop (PLL) of the master DPU 1402 and the pixel clock may drive logic of interfaces of the slave DPU 1502.

Figure 16:
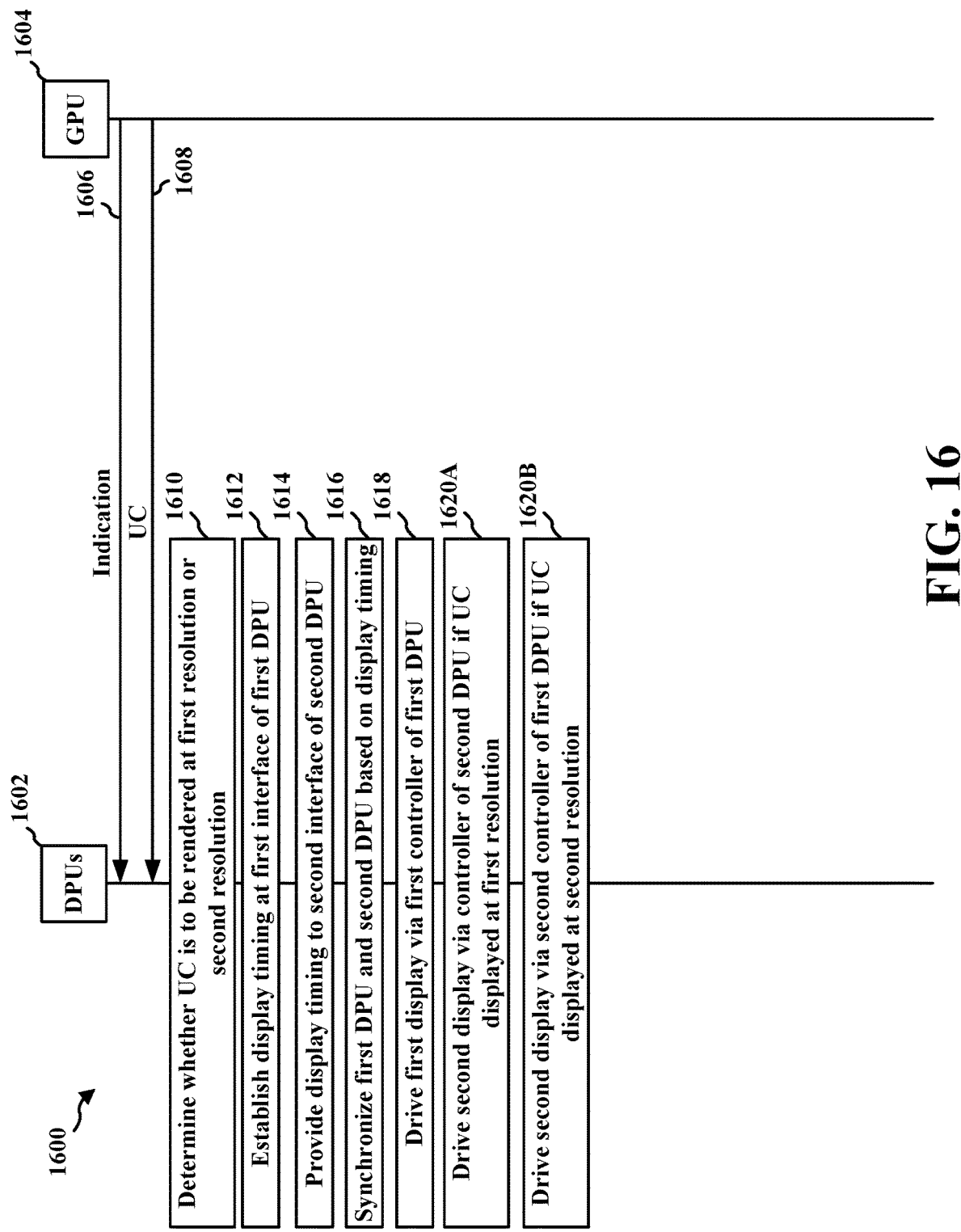
FIG. 16 is a call flow diagram illustrating example communications between DPUs and a graphics processing unit (GPU).

FIG. 16 is a call flow diagram 1600 illustrating example communications between DPUs 1602 and a GPU 1604. The DPUs 1602 may include a first DPU and a second DPU. In an example, the first DPU may be or include the first DPU 410A, the first DPU core 802, the first DPU 1106, the first DPU core 1202, or the master DPU 1402. In an example, the second DPU may be or include the second DPU 410B, the second DPU core 902, the second DPU 1112, the second DPU core 1204, or the slave DPU 1502.

At 1606, the first DPU may obtain an indication from the GPU 1604 that UC is to be displayed (e.g., rendered) at a first resolution (e.g., high resolution) or a second resolution (e.g., low resolution), where the first resolution is greater than the second resolution. In an example, the UC is video content associated with an AR application, a VR application, or a MR application. At 1608, the first DPU may obtain the UC from the GPU 1604.

At 1610, the first DPU may determine whether the UC is to be displayed (e.g., rendered) at the first resolution or the second resolution based on the indication. At 1612, the first DPU may establish a display timing at a first interface of the first DPU. At 1614, the first interface of the first DPU may provide the display timing to a second interface of the second DPU. At 1616, the first DPU and the second DPU may synchronize based on the display timing. At 1618, the first DPU may drive a first display via a first controller of the first DPU. At 1620A, the second DPU may drive a second display via a controller of the second DPU if the UC is to be displayed (e.g., rendered) at the first resolution. At 1620B, the first DPU may drive the second display via a second controller of the first DPU if the UC is to be displayed (e.g., rendered) at the second resolution.

Figure 17:
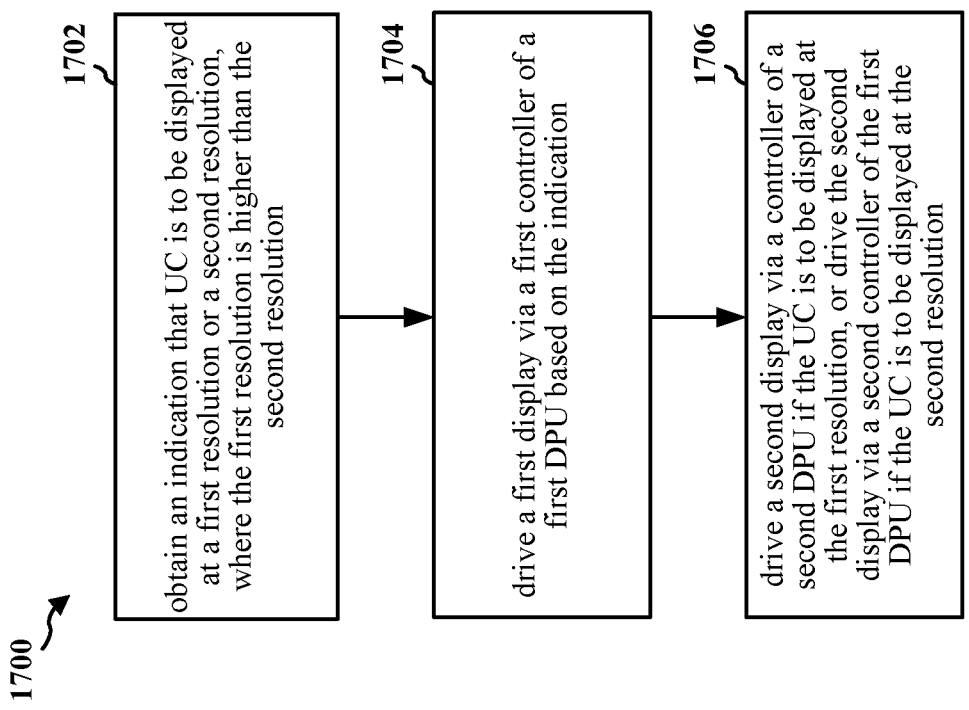
FIG. 17 is a flowchart of an example method of display processing in accordance with one or more techniques of this disclosure.

FIG. 17 is a flowchart 1700 of an example method of display processing in accordance with one or more techniques of this disclosure. The method may be performed by an apparatus, such as an apparatus for display processing, a display processing unit (DPU) or other display processor, a wireless communication device, and the like, as used in connection with the aspects of FIGS. 1-16. In an example, the method may be performed by the DPU selector 198.

At 1702, the apparatus (e.g., a DPU) obtains an indication that UC is to be displayed at a first resolution or a second resolution, where the first resolution is higher than the second resolution. For example, FIG. 16 at 1606 shows that a first DPU (included in the DPUs 1602) may obtain an indication that UC is to be displayed at a first resolution or a second resolution. In an example, the UC may be or include the first frame 404A and the second frame 404B. In a further example, the first resolution may be 4300×4300 pixels as illustrated in FIG. 4 and the second resolution may be 2048×2048 pixels as illustrated in FIG. 5. In an example, 1702 may be performed by the DPU selector 198.

At 1704, the apparatus (e.g., a DPU) drives a first display via a first controller of a first DPU based on the indication. For example, FIG. 16 at 1618 shows that a first DPU (included in the DPUs 1602) may drive a first display via a first controller of the first DPU. In an example, the first display may be the first display 406A, the first controller may be the first eDP controller 416, and the first DPU may be the first DPU 410A. In another example, the first controller and the first DPU may correspond to aspects described above in connection with FIGS. 8 and 10. For instance, the first controller may be the first controller 804. In a further example, the first DPU may be the first DPU 1106 or the master DPU 1402. The first DPU may also include the first DPU core 802 or the first DPU core 1202. In an example, 1704 may be performed by the DPU selector 198.

At 1706, the apparatus (e.g., a DPU) drives a second display via a controller of a second DPU if the UC is to be displayed at the first resolution, or the apparatus (e.g., a DPU) drives the second display via a second controller of the first DPU if the UC is to be displayed at the second resolution. For example, FIG. 16 at 1620A shows that a second display may be driven via a controller of a second DPU if UC is to be displayed at the first resolution and FIG. 16 at 1620B shows that the second display may be driven via a second controller of the first DPU if UC is to be displayed at the second resolution. In an example, the controller of the second DPU may be the eDP controller 422 and the second DPU may be the second DPU 410B. In an example, the second controller of the first DPU may be the second eDP controller 424. In a further example, the controller of the second DPU may be the first controller 904. In another example, the second controller of the first DPU may be the second controller 814. In a further example, the second display may be the second display 406B. In an example, 1706 may be performed by the DPU selector 198.

In one aspect, the UC may be associated with a VR application, an AR application, or an XR application. For instance, FIGS. 4 and 5 depict UC that may be associated with a VR application, an AR application, or an XR application.

In one aspect, the controller of the second DPU may be a first embedded eDP controller, the first controller of the first DPU may be a second eDP controller, and the second controller of the first DPU may be a third eDP controller. For example, the controller of the second DPU may be the eDP controller 422, the first controller of the first DPU may be the first eDP controller 416, and the second controller of the first DPU may be the second eDP controller 424.

In one aspect, the controller of the second DPU may be in a power collapsed state if the UC is to be displayed at the second resolution. For example, FIG. 5 illustrates that the eDP controller 422 of the second DPU 410B may be in a power collapsed state if the UC is to be displayed at a second resolution.

In one aspect, the power collapsed state may be a GDS collapsed state. For example, the power collapsed state illustrated in FIG. 5 may be a GDS collapsed state.

In one aspect, the first resolution may be associated with a first throughput configuration, where the second resolution may be associated with a second throughput configuration. For example, the first throughput configuration may be associated with aspects described in FIG. 4 and the second throughput configuration may be associated with aspects described in FIG. 5.

In one aspect, the apparatus (e.g., a DPU) may divide a frame of the UC into a first set of slices and a second set of slices. For example, FIG. 4 illustrates that the first frame 404A may be divided into a first plurality of slices 412A-412B and the second frame 404B may be divided into a second plurality of slices 420A-420B. In another example, FIG. 6 illustrates that the first frame 404A may be divided into the first plurality of slices 412A-412B.

In one aspect, the apparatus (e.g., a DPU) may provide the first set of slices to the first controller of the first DPU. For example, FIG. 4 illustrates that the first plurality of slices 412A-412B may be provided to a first controller of the first DPU 410A.

In one aspect, the apparatus (e.g., a DPU) may provide the second set of slices to the controller of the second DPU if the UC is to be displayed at the first resolution. For example, FIG. 4 illustrates that the second plurality of slices 420A-420B may be provided to a second controller (e.g., the eDP controller 422) of the second DPU 410B if the UC is to be displayed at the first resolution.

In one aspect, the apparatus (e.g., a DPU) may divide a frame of the UC into a first set of slices and a second set of slices. For example, FIG. 5 illustrates that a frame may be divided into a first set of slices and a second set of slices.

In one aspect, the apparatus (e.g., a DPU) may provide the first set of slices to the first controller of the first DPU. For example, FIG. 5 illustrates that a first set of slices may be provided to a first controller (e.g., the first eDP controller 416) of the first DPU 410A.

In one aspect, the apparatus (e.g., a DPU) may provide the second set of slices to the second controller of the first DPU if the UC is to be displayed at the second resolution. For example, FIG. 5 illustrates that a second set of slices may be provided to a second controller (e.g., the second eDP controller 424) of the first DPU 410A.

In one aspect, driving the first display may include transmitting a first indication to the first display that causes first UC associated with the UC to be displayed on the first display, and driving the second display may include transmitting a second indication to the second display that causes second UC associated with the UC to be displayed on the second display. For example, FIGS. 4 and 5 show that a first processed frame 414A (i.e., first UC) may be displayed on the first display 406A and that a second processed frame 414B (i.e., second UC) may be displayed on the second display 406B.

In one aspect, a MUX may multiplex a first signal associated with the first DPU and a second signal associated with the second DPU, and driving the second display may be based on the multiplexing of the first signal and the second signal. For example, the MUX may be the multiplexer 910 and the multiplexer 910 may multiplex a first signal associated with the first DPU and a second signal associated with the second DPU. In another example, the MUX may include aspects described in connection with FIG. 10.

In one aspect, the MUX may be controlled by at least one of: software, a display driver, display driver software, a first display driver associated with the first DPU, a second display driver associated with the second DPU, or a CPU. For example, the multiplexer 910 may be controlled by software, a display driver, display driver software, a first display driver associated with the first DPU, a second display driver associated with the second DPU, and/or a CPU.

In one aspect, obtaining the indication that the UC is to be displayed may include setting a bit of a register of the software or the display driver software, where the bit may be set as a first bit if the UC is to be displayed at the first resolution, where the bit may be set as a second bit if the UC is to be displayed at the second resolution, where the first bit is different from the second bit. For example, the bit of the register of the software or the display driver software may be associated with aspects described above in connection with FIGS. 8 and 9.

In one aspect, the first DPU and the second DPU may be associated with a SOC. For example, the first DPU 410A and the second DPU 410B may be associated with a SOC.

In one aspect, the apparatus (e.g., a DPU) may receive, prior to driving the first display and prior to driving the second display, the UC from a GPU. For example, FIG. 16 at 1608 shows that UC may be received from a GPU 1604.

In one aspect, the first display and the second display may be included by a headset worn on a head of a user. For example, the headset worn on the head of the user may be the headset illustrated in FIGS. 4 and 5.

In one aspect, a clock output of a PLL associated with the controller is routed to a first RCG of the second DPU and a second RCG of the first DPU. For example, a clock output of a PLL associated with the first controller may be routed to the first RCG 906 of the second DPU core 902 and the second RCG 816 of the first DPU core 802.

In one aspect, the apparatus (e.g., a DPU) may establish a display timing at a first interface of the first DPU. For example, FIG. 16 at 1612 shows that a display timing may be established at a first interface of a first DPU. For example, FIG. 11 shows that a display timing (e.g., "TIMEGEN_EN") may be established at a master interface 1108 of a first DPU 1106. In another example, FIG. 12 shows that a display timing may be established at the first interface 1206 of the first DPU core 1202.

In one aspect, the apparatus (e.g., a DPU) may synchronize the first DPU and the second DPU based on the display timing. For example, FIG. 16 at 1616 shows that a first DPU and a second DPU may be synchronized based on the display timing. For example, FIG. 11 illustrates that the first DPU 1106 and the second DPU 1112 may be synchronized based on a display timing. For example, FIG. 12 illustrates that the first DPU core 1202 and the second DPU core 1204 may be synchronized based on a display timing.

In one aspect, the apparatus (e.g., a DPU) may provide the display timing to a second interface of the second DPU prior to synchronizing the first DPU and the second DPU. For example, FIG. 16 at 1614 shows that a display timing may be provided to a second interface of a second DPU. For example, FIG. 11 shows that the first DPU 1106 may provide the display timing to the master interface 1114 of the second DPU 1112 prior to synchronizing the first DPU 1106 and the second DPU 1112.

In one aspect, the first interface of the first DPU may be a first master interface and the second interface of the second DPU may be a second master interface. For example, FIG. 11 illustrates that the first DPU 1106 may include a master interface 1108 and the second DPU 1112 may include a master interface 1114.

In one aspect, providing the display timing to the second interface of the second DPU may include providing the display timing to the second interface of the second DPU based on an output of a MUX. For example, FIG. 12 illustrates that providing a display timing to a first interface 1210 of the second DPU core 1204 may be based on an output of a first multiplexer 1216 and/or a second multiplexer 1218.

In one aspect, at least one of a delay or a skew between the first DPU and the second DPU may be controlled by software or display driver software. For example, FIG. 13 illustrates that at least one of a delay or a skew between the first DPU and the second DPU may be controlled by software or display driver software.

In one aspect, the first DPU and the second DPU may be synchronized based on a counter reaching a value. For example, the counter may be the counter 1214 and the value may be "Q_DPU_SYNC_PROG_INTF_OFFSET_EN_VALUE0" or another appropriate value.

In one aspect, the value may be indicated by a bit in a software register. For example, the value associated with the counter 1214 may be indicated by a bit in a software register.

In one aspect, the counter may be associated with a VSync operation of at least one of the first display or the second display. For example, FIG. 12 illustrates that the counter 1214 may be associated with a VSync operation.

In one aspect, the first display and the second display may be driven based on the display timing if the UC is to be displayed at the first resolution. For example, the first display 406A and the second display 406B may be driven based on the display timing if the UC is to be displayed at the first resolution.

In one aspect, the indication that the UC is to be displayed at the first resolution or the second resolution may indicate that the UC is to be rendered at the first resolution or the second resolution. For example, the indication received by the first DPU (included in the DPUs 1602) at 1606 may indicate that the UC is to be rendered at the first resolution or the second resolution.

In one aspect, the apparatus (e.g., a DPU) may determine, based on the indication, whether the UC is to be displayed at the first resolution or the second resolution. For example, FIG. 16 at 1610 shows that an apparatus may determine whether the UC is to be displayed at the first resolution or the second resolution based on the indication received at 1616.

In configurations, a method or an apparatus for display processing is provided. The apparatus may be a DPU, a display processor, or some other processor that may perform display processing. In aspects, the apparatus may be the display processor 127 within the device 104, or may be some other hardware within the device 104 or another device. The apparatus may include means for obtaining an indication that UC is to be displayed at a first resolution or a second resolution, where the first resolution is higher than the second resolution. The apparatus may further include means for determining, based on the indication, whether the UC is to be displayed at a first resolution or a second resolution. The apparatus may include means for driving a first display via a first controller of a first DPU based on the indication. The apparatus may include means for driving a second display via a controller of a second DPU if the UC is to be displayed at the first resolution, or driving the second display via a second controller of the first DPU if the UC is to be displayed at the second resolution. The apparatus may include means for dividing a frame of the UC into a first set of slices and a second set of slices. The apparatus may include means for providing the first set of slices to the first controller of the first DPU. The apparatus may include means for providing the second set of slices to the controller of the second DPU if the UC is to be displayed at the first resolution. The apparatus may include means for dividing a frame of the UC into a first set of slices and a second set of slices. The apparatus may include means for providing the first set of slices to the first controller of the first DPU. The apparatus may include means for providing the second set of slices to the second controller of the first DPU if the UC is to be displayed at the second resolution. The means for driving the first display may include means for transmitting a first indication that causes first UC associated with the UC to be displayed on the first display. The means for driving the second display may include means for transmitting a second indication that causes second UC associated with the UC to be displayed on the second display. The means for obtaining the indication that the UC is to be displayed may include means for setting a bit of a register of the software or the display driver software, where the bit is set as a first bit if the UC is to be displayed at the first resolution, where the bit is set as a second bit if the UC is to be displayed at the second resolution, where the first bit is different from the second bit. The apparatus may include means for receiving, prior to driving the first display and prior to driving the second display, the UC from a GPU. The apparatus may include means for establishing a display timing at a first interface of the first DPU. The apparatus may include means for synchronizing the first DPU and the second DPU based on the display timing. The apparatus may include means for providing the display timing to a second interface of the second DPU prior to synchronizing the first DPU and the second DPU.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 a method of display processing, including: obtaining an indication that user content (UC) is to be displayed at a first resolution or a second resolution, where the first resolution is greater than the second resolution; driving a first display via a first controller of a first display processing unit (DPU); and driving a second display via a controller of a second DPU if the UC is to be displayed at the first resolution, or driving the second display via a second controller of the first DPU if the UC is to be displayed at the second resolution.

Aspect 2 may be combined with aspect 1 and includes that the UC is associated with a virtual reality (VR) application, an augmented reality (AR) application, or an extended reality (XR) application.

Aspect 3 may be combined with any of aspects 1-2 and includes that the controller of the second DPU is a first embedded DisplayPort (eDP) controller, the first controller of the first DPU is a second eDP controller, and the second controller of the first DPU is a third eDP controller.

Aspect 4 may be combined with any of aspects 1-3 and includes that the controller of the second DPU is in a power collapsed state if the UC is to be displayed at the second resolution.

Aspect 5 may be combined with aspect 4 and includes that the power collapsed state is a globally distributed switch (GDS) collapsed state.

Aspect 6 may be combined with any of aspects 1-5 and includes that the first resolution is associated with a first throughput configuration, where the second resolution is associated with a second throughput configuration.

Aspect 7 may be combined with any of aspects 1-6 and further includes: dividing a frame of the UC into a first set of slices and a second set of slices; providing the first set of slices to the first controller of the first DPU; and providing the second set of slices to the controller of the second DPU if the UC is to be displayed at the first resolution.

Aspect 8 may be combined with any of aspects 1-6 and further includes: dividing a frame of the UC into a first set of slices and a second set of slices; providing the first set of slices to the first controller of the first DPU; and providing the second set of slices to the second controller of the first DPU if the UC is to be displayed at the second resolution.

Aspect 9 may be combined with any of aspects 1-8 and includes that driving the first display includes transmitting a first indication to the first display that causes first UC associated with the UC to be displayed on the first display, and where driving the second display includes transmitting a second indication to the second display that causes second UC associated with the UC to be displayed on the second display.

Aspect 10 may be combined with any of aspects 1-9 and includes that a multiplexer (MUX) multiplexes a first signal associated with the first DPU and a second signal associated with the second DPU, where driving the second display is based on the multiplexing the first signal and the second signal.

Aspect 11 may be combined with aspect 10 and includes that the MUX is controlled by at least one of: software, a display driver, display driver software, a first display driver associated with the first DPU, a second display driver associated with the second DPU, or a central processing unit (CPU).

Aspect 12 may be combined with aspect 11 and includes that obtaining the indication that the UC is to be displayed includes setting a bit of a register of the software or the display driver software, where the bit is set as a first bit if the UC is to be displayed at the first resolution, where the bit is set as a second bit if the UC is to be displayed at the second resolution, where the first bit is different from the second bit.

Aspect 13 may be combined with any of aspects 1-12 and includes that the first DPU and the second DPU are associated with a system-on-chip (SOC).

Aspect 14 may be combined with any of aspects 1-13 and further includes: receiving, prior to driving the first display and prior to driving the second display, the UC from a graphics processing unit (GPU).

Aspect 15 may be combined with any of aspects 1-14 and includes that the first display and the second display are included by a headset worn on a head of a user.

Aspect 16 may be combined with any of aspects 1-15 and includes that a clock output of a phased lock loop (PLL) associated with the controller is routed to a first root clock gate (RCG) of the second DPU and a second RCG of the first DPU Aspect 17 may be combined with any of aspects 1-16 and further includes: establishing a display timing at a first interface of the first DPU; and synchronizing the first DPU and the second DPU based on the display timing.

Aspect 18 may be combined with aspect 17 and further includes: providing the display timing to a second interface of the second DPU prior to synchronizing the first DPU and the second DPU.

Aspect 19 may be combined with aspect 18 and includes that the first interface of the first DPU is a first master interface and the second interface of the second DPU is a second master interface.

Aspect 20 may be combined with any of aspects 18-19 and includes that providing the display timing to the second interface of the second DPU is based on an output of a multiplexer (MUX).

Aspect 21 may be combined with any of aspects 18-20 and includes that at least one of a delay or a skew between the first DPU and the second DPU is controlled by software or display driver software.

Aspect 22 may be combined with any of aspects 18-21 and includes that the first DPU and the second DPU are synchronized based on a counter reaching a value.

Aspect 23 may be combined with aspect 22 and includes that the value is indicated by a bit in a software register.

Aspect 24 may be combined with any of aspects 22-23 and includes that the counter is associated with a vertical synchronization (VSync) operation of at least one of the first display or the second display.

Aspect 25 may be combined with any of aspects 17-24 and includes that the first display and the second display are driven based on the display timing if the UC is to be displayed at the first resolution.

Aspect 26 may be combined with any of aspects 1-25 and includes that the indication that the UC is to be displayed at the first resolution or the second resolution indicates that the UC is to be rendered at the first resolution or the second resolution.

Aspect 27 may be combined with any of aspects 1-26 and further includes: determine, based on the indication, whether the UC is to be displayed at the first resolution or the second resolution, where the first display and the second display are driven based on the determination.

Aspect 28 is an apparatus for display processing including at least one processor coupled to a memory and, based at least in part on information stored in the memory, the at least one processor is configured to implement a method as in any of aspects 1-27.

Aspect 29 may be combined with aspect 28 and includes that the apparatus is a wireless communication device, further including at least one of an antenna or a transceiver coupled to the at least one processor, wherein to obtain the indication, the at least one processor is configured to receive the indication via at least one of the antenna or the transceiver.

Aspect 30 is an apparatus for display processing including means for implementing a method as in any of aspects 1-27.

Aspect 31 is a computer-readable medium (e.g., a non-transitory computer-readable medium) storing computer executable code, the code when executed by at least one processor causes the at least one processor to implement a method as in any of aspects 1-27.

Various aspects have been described herein. These and other aspects are within the scope of the following claims.

What is claimed is:

1. An apparatus for display processing, comprising:
a memory; and
at least one processor coupled to the memory and, based at least in part on information stored in the memory, the at least one processor is configured to:
obtain an indication that user content (UC) is to be displayed at a first resolution or a second resolution, wherein the first resolution is higher than the second resolution;
drive a first display via a first controller included in a first display processing unit (DPU) based on the indication;
drive a second display via a third controller included in a second DPU in response to the indication indicating that the UC is to be displayed at the first resolution; and
drive the second display via a second controller included in the first DPU in response to the indication indicating that the UC is to be displayed at the second resolution.

2. The apparatus of claim 1, wherein the UC is associated with a virtual reality (VR) application, an augmented reality (AR) application, or an extended reality (XR) application.

3. The apparatus of claim 1, wherein the third controller included in the second DPU is a first embedded DisplayPort (eDP) controller, the first controller included in the first DPU is a second eDP controller, and the second controller included in the first DPU is a third eDP controller.

4. The apparatus of claim 1, wherein the third controller included in the second DPU is in a power collapsed state if the UC is to be displayed at the second resolution.

5. The apparatus of claim 4, wherein the power collapsed state is a globally distributed switch (GDS) collapsed state.

6. The apparatus of claim 1, wherein the first resolution is associated with a first throughput configuration, wherein the second resolution is associated with a second throughput configuration.

7. The apparatus of claim 1, wherein the at least one processor is further configured to:
divide a frame of the UC into a first set of slices and a second set of slices;
provide the first set of slices to the first controller included in the first DPU; and
provide the second set of slices to the third controller included in the second DPU if the UC is to be displayed at the first resolution.

8. The apparatus of claim 1, wherein the at least one processor is further configured to:
divide a frame of the UC into a first set of slices and a second set of slices;
provide the first set of slices to the first controller included in the first DPU; and
provide the second set of slices to the second controller included in the first DPU if the UC is to be displayed at the second resolution.

9. The apparatus of claim 1, wherein to drive the first display, the at least one processor is configured to transmit a first indication to the first display indicating first UC associated with the UC to be displayed on the first display, and wherein to drive the second display, the at least one processor is configured to transmit a second indication to the second display indicating second UC associated with the UC to be displayed on the second display.

10. The apparatus of claim 1, wherein a multiplexer (MUX) multiplexes a first signal associated with the first DPU and a second signal associated with the second DPU, wherein to drive the second display, the at least one processor is configured to drive the second display based on the multiplexing of the first signal and the second signal.

11. The apparatus of claim 10, wherein the MUX is controlled by at least one of:
software, a display driver, display driver software, a first display driver associated with the first DPU, a second display driver associated with the second DPU, or a central processing unit (CPU).

12. The apparatus of claim 11, wherein to obtain the indication that the UC is to be displayed, the at least one processor is configured to:

set a bit of a register of the software or the display driver software, wherein the bit is configured to be set as a first bit if the UC is to be displayed at the first resolution, wherein the bit is configured to be set as a second bit if the UC is to be displayed at the second resolution, wherein the first bit is different from the second bit.

13. The apparatus of claim 1, wherein the first DPU and the second DPU are associated with a system-on-chip (SOC).

14. The apparatus of claim 1, wherein the at least one processor is further configured to:
receive, prior to drive the first display and prior to drive the second display, the UC from a graphics processing unit (GPU).

15. The apparatus of claim 1, wherein the first display and the second display are comprised by a headset worn on a head of a user.

16. The apparatus of claim 1, wherein a clock output of a phased lock loop (PLL) associated with the third controller is configured to be routed to a first root clock gate (RCG) of the second DPU and a second RCG of the first DPU.

17. The apparatus of claim 1, wherein the at least one processor is further configured to:
establish a display timing at a first interface of the first DPU; and
synchronize the first DPU and the second DPU based on the display timing.

18. The apparatus of claim 17, wherein the at least one processor is further configured to:
provide the display timing to a second interface of the second DPU prior to the synchronization.

19. The apparatus of claim 18, wherein the first interface of the first DPU is a first master interface and the second interface of the second DPU is a second master interface.

20. The apparatus of claim 18, wherein to provide the display timing to the second interface of the second DPU, the at least one processor is configured to provide the display timing to the second interface of the second DPU based on an output of a multiplexer (MUX).

21. The apparatus of claim 18, wherein at least one of a delay or a skew between the first DPU and the second DPU is controlled by software or display driver software.

22. The apparatus of claim 18, wherein to synchronize the first DPU and the second DPU, the at least one processor is configured to synchronize the first DPU and the second DPU based on a counter reaching a value.

23. The apparatus of claim 22, wherein the value is indicated by a bit in a software register.

24. The apparatus of claim 22, wherein the counter is associated with a vertical synchronization (VSync) operation of at least one of the first display or the second display.

25. The apparatus of claim 17, wherein to drive the first display and the second display, the at least one processor is configured to drive the first display and the second display based on the display timing if the UC is to be displayed at the first resolution.

26. The apparatus of claim 1, wherein the indication that the UC is to be displayed at the first resolution or the second resolution indicates that the UC is to be rendered at the first resolution or the second resolution.

27. The apparatus of claim 1, wherein the at least one processor is further configured to:
determine, based on the indication, whether the UC is to be displayed at the first resolution or the second resolution, wherein to drive the first display and the second display, the at least one processor is configured to drive the first display and the second display based on the determination.

28. The apparatus of claim 1, wherein the apparatus is a wireless communication device, further comprising at least one of an antenna or a transceiver coupled to the at least one processor, wherein to obtain the indication, the at least one processor is configured to receive the indication via at least one of the antenna or the transceiver.

29. A method of display processing, comprising:
obtaining an indication that user content (UC) is to be displayed at a first resolution or a second resolution, wherein the first resolution is higher than the second resolution;
driving a first display via a first controller included in a first display processing unit (DPU);
driving a second display via a third controller included in a second DPU in response to the indication indicating that the UC is to be displayed at the first resolution; and
driving the second display via a second controller included in the first DPU in response to the indication indicating that the UC is to be displayed at the second resolution.

30. A non-transitory computer-readable medium storing computer executable code, the code when executed by at least one processor, causes the at least one processor to:
obtain an indication that user content (UC) is to be displayed at a first resolution or a second resolution, wherein the first resolution is higher than the second resolution;
drive a first display via a first controller included in a first display processing unit (DPU) based on the indication; and
drive a second display via a third controller included in a second DPU in response to the indication indicating that the UC is to be displayed at the first resolution; and
drive the second display via a second controller included in the first DPU in response to the indication indicating that the UC is to be displayed at the second resolution.

* * * * *